(12) United States Patent
Pandolfino

(10) Patent No.: US 10,820,624 B2
(45) Date of Patent: Nov. 3, 2020

(54) ARTICLES AND FORMULATIONS FOR SMOKING PRODUCTS AND VAPORIZERS

(71) Applicant: Joseph Pandolfino, Clarence, NY (US)

(72) Inventor: Joseph Pandolfino, Clarence, NY (US)

( * ) Notice: Subject to any disclaimer, the term of this patent is extended or adjusted under 35 U.S.C. 154(b) by 0 days.

(21) Appl. No.: 16/593,701

(22) Filed: Oct. 4, 2019

(65) Prior Publication Data

US 2020/0035121 A1 Jan. 30, 2020

Related U.S. Application Data

(63) Continuation of application No. 16/569,318, filed on Sep. 12, 2019, which is a continuation-in-part of application No. 16/178,298, filed on Nov. 1, 2018, which is a continuation of application No. 16/047,948, filed on Jul. 27, 2018.

(51) Int. Cl.
*A24D 1/02* (2006.01)
*A24D 1/18* (2006.01)
*A24B 15/30* (2006.01)

(52) U.S. Cl.
CPC .............. *A24D 1/18* (2013.01); *A24B 15/303* (2013.01); *A24D 1/02* (2013.01)

(58) Field of Classification Search
None
See application file for complete search history.

(56) References Cited

U.S. PATENT DOCUMENTS

| | | |
|---|---|---|
| 3,612,066 A | 10/1971 | Jones et al. |
| 3,943,945 A | 3/1976 | Rosen |
| 4,037,609 A | 7/1977 | Newton et al. |
| 4,038,993 A | 8/1977 | Geiss et al. |
| 4,068,671 A | 1/1978 | Casey |
| 4,144,894 A | 3/1979 | Schmidt et al. |
| 4,150,677 A | 4/1979 | Osborne, Jr. et al. |
| 4,153,063 A | 5/1979 | Roselius et al. |
| 4,155,909 A | 5/1979 | Sanders et al. |
| 4,176,668 A | 12/1979 | Fiore et al. |

(Continued)

FOREIGN PATENT DOCUMENTS

| | | | |
|---|---|---|---|
| GB | 1111007 | * 4/1968 | ............... A24D 1/02 |
| WO | 9428142 A1 | 12/1994 | |

(Continued)

OTHER PUBLICATIONS

Todd, et al., "A functional genomics screen identifies diverse transcription factors that regulate alkaloid biosynthesis in Nicotiana benthamiana", The Plant Journal, vol. 62, 2010, pp. 589-600 (12 pages total).

(Continued)

*Primary Examiner* — Michael H. Wilson
*Assistant Examiner* — Katherine A Will
(74) *Attorney, Agent, or Firm* — Sughrue Mion, PLLC

(57) ABSTRACT

Methods and apparatuses for the customization of tobacco and cannabis smoking products including formulations for onserts, precision rods and precision pods for harm reduction products particularly for those who simultaneously smoke or vape tobacco and marijuana, as well as methods and apparatuses for blending a salt of nicotine in crystalline form and one or more cannabinoids in crystalline form for a precision pod for use in a vaporizer.

12 Claims, 3 Drawing Sheets

(56) References Cited

U.S. PATENT DOCUMENTS

| | | | |
|---|---|---|---|
| 4,182,349 | A | 1/1980 | Selke |
| 4,196,738 | A | 4/1980 | Hollenton et al. |
| 4,215,706 | A | 8/1980 | Larson et al. |
| 4,220,781 | A | 9/1980 | Sanders et al. |
| 4,236,532 | A | 12/1980 | Schweizer et al. |
| 4,258,728 | A | 3/1981 | Cogbill, II |
| 4,270,552 | A | 6/1981 | Jenkins et al. |
| 4,279,824 | A | 7/1981 | McKinney |
| 4,308,877 | A | 1/1982 | Mattina |
| 4,321,387 | A | 3/1982 | Chavdarian et al. |
| 4,328,816 | A | 5/1982 | Coghill, II |
| 4,332,945 | A | 6/1982 | Edwards, III |
| 4,333,482 | A | 6/1982 | Banyasz |
| 4,337,783 | A | 7/1982 | Hooper et al. |
| 4,340,072 | A | 7/1982 | Bolt et al. |
| 4,341,228 | A | 7/1982 | Keritsis et al. |
| 4,421,126 | A | 12/1983 | Gellatly |
| 4,442,292 | A | 4/1984 | Edwards, III |
| 4,452,984 | A | 6/1984 | Edwards, III |
| 4,515,542 | A | 5/1985 | Peschetz |
| 4,542,755 | A | 9/1985 | Selke et al. |
| 4,557,280 | A | 12/1985 | Gravely et al. |
| 4,590,278 | A | 5/1986 | Edwards, III |
| 4,595,024 | A | 6/1986 | Greene et al. |
| 4,598,721 | A | 7/1986 | Stiller et al. |
| 4,646,764 | A | 3/1987 | Young et al. |
| 4,676,259 | A | 6/1987 | Ellis et al. |
| 4,681,126 | A | 7/1987 | Strubel et al. |
| 4,706,692 | A | 11/1987 | Gellatly |
| 4,708,151 | A | 11/1987 | Shelar |
| 4,714,082 | A | 12/1987 | Banerjee et al. |
| 4,732,168 | A | 3/1988 | Resce et al. |
| 4,756,318 | A | 7/1988 | Clearman et al. |
| 4,765,347 | A | 8/1988 | Sensabaugh, Jr. et al. |
| 4,771,795 | A | 9/1988 | White et al. |
| 4,787,402 | A | 11/1988 | Leonard |
| 4,793,365 | A | 12/1988 | Sensabaugh, Jr. et al. |
| 4,819,665 | A | 4/1989 | Roberts et al. |
| 4,821,749 | A | 4/1989 | Toft et al. |
| 4,827,950 | A | 5/1989 | Banerjee et al. |
| 4,830,028 | A | 5/1989 | Lawson et al. |
| 4,854,331 | A | 8/1989 | Banerjee et al. |
| 4,858,630 | A | 8/1989 | Banerjee et al. |
| 4,895,175 | A | 1/1990 | Baskevitch et al. |
| 4,898,188 | A | 2/1990 | Niven, Jr. et al. |
| 4,903,714 | A | 2/1990 | Barnes et al. |
| 4,941,483 | A | 7/1990 | Ridings et al. |
| 4,947,874 | A | 8/1990 | Brooks et al. |
| 4,966,171 | A | 10/1990 | Serrano et al. |
| 4,967,771 | A | 11/1990 | Fagg et al. |
| 4,967,774 | A | 11/1990 | White |
| 4,989,619 | A | 2/1991 | Clearman et al. |
| 4,991,606 | A | 2/1991 | Serrano et al. |
| 5,015,741 | A | 5/1991 | Osdene et al. |
| 5,018,540 | A | 5/1991 | Grubbs et al. |
| 5,019,122 | A | 5/1991 | Clearman et al. |
| 5,020,548 | A | 6/1991 | Farrier et al. |
| 5,025,812 | A | 6/1991 | Fagg et al. |
| 5,031,646 | A | 7/1991 | Lippiello et al. |
| 5,033,483 | A | 7/1991 | Clearman et al. |
| 5,050,621 | A | 9/1991 | Creighton et al. |
| 5,065,775 | A | 11/1991 | Fagg |
| 5,067,499 | A | 11/1991 | Banerjee et al. |
| 5,076,292 | A | 12/1991 | Sensabaugh, Jr. et al. |
| 5,099,861 | A | 3/1992 | Clearman et al. |
| 5,101,839 | A | 4/1992 | Jakob et al. |
| 5,105,831 | A | 4/1992 | Banerjee et al. |
| 5,105,836 | A | 4/1992 | Gentry et al. |
| 5,119,835 | A | 6/1992 | Heemann et al. |
| 5,138,062 | A | 8/1992 | Osdene et al. |
| 5,159,940 | A | 11/1992 | Hayward et al. |
| 5,247,947 | A | 9/1993 | Clearman et al. |
| 5,260,205 | A | 11/1993 | Nakatani et al. |
| 5,285,798 | A | 2/1994 | Banerjee et al. |
| 5,327,917 | A | 7/1994 | Lekwauwa et al. |
| 5,339,838 | A | 8/1994 | Young et al. |
| 5,345,951 | A | 9/1994 | Serrano et al. |
| 5,369,023 | A | 11/1994 | Nakatani et al. |
| 5,377,698 | A | 1/1995 | Litzinger et al. |
| 5,479,948 | A | 1/1996 | Counts et al. |
| 5,497,792 | A | 3/1996 | Prasad et al. |
| 5,505,214 | A | 4/1996 | Collins et al. |
| 5,533,530 | A | 7/1996 | Young et al. |
| 5,584,306 | A | 12/1996 | Beauman et al. |
| 5,598,868 | A | 2/1997 | Jakob et al. |
| 5,665,262 | A | 9/1997 | Hajaligol et al. |
| 5,666,976 | A | 9/1997 | Adams et al. |
| 5,666,977 | A | 9/1997 | Higgins et al. |
| 5,666,987 | A | 9/1997 | Combs |
| 5,668,295 | A | 9/1997 | Wahab et al. |
| 5,684,241 | A | 11/1997 | Nakatani et al. |
| 5,708,258 | A | 1/1998 | Counts et al. |
| 5,713,376 | A | 2/1998 | Berger |
| 5,715,844 | A | 2/1998 | Young et al. |
| 5,724,998 | A | 3/1998 | Gellatly et al. |
| 5,730,158 | A | 3/1998 | Collins et al. |
| 5,743,251 | A | 4/1998 | Howell et al. |
| 5,750,964 | A | 5/1998 | Counts et al. |
| 5,765,570 | A | 6/1998 | Litzinger et al. |
| 5,880,164 | A | 3/1999 | Keenan |
| 5,908,034 | A | 6/1999 | Adedeji |
| 5,934,289 | A | 8/1999 | Watkins et al. |
| 5,947,128 | A | 9/1999 | Adedeji |
| 6,053,176 | A | 4/2000 | Adams et al. |
| 6,113,940 | A | 9/2000 | Brooke et al. |
| 6,153,119 | A | 11/2000 | Sung |
| 6,216,706 | B1 | 4/2001 | Kumar et al. |
| 6,328,992 | B1 | 12/2001 | Brooke et al. |
| 6,403,126 | B1 | 6/2002 | Webster et al. |
| 6,423,520 | B1 | 7/2002 | Conkling et al. |
| 6,508,254 | B1 | 1/2003 | Mua et al. |
| 6,563,009 | B1 | 5/2003 | Kunos et al. |
| 6,571,803 | B1 | 6/2003 | Bregeard |
| 6,595,216 | B1 | 6/2003 | Wessinger |
| 6,586,661 | B1 | 7/2003 | Conkling et al. |
| 6,694,985 | B1 | 2/2004 | Kim |
| 6,761,176 | B2 | 8/2004 | Sun |
| 6,772,769 | B2 | 8/2004 | Sun |
| 6,807,969 | B1 | 10/2004 | Wessinger et al. |
| 6,907,887 | B2 | 6/2005 | Conkling |
| 6,911,541 | B2 | 6/2005 | Conkling et al. |
| 6,930,122 | B2 | 8/2005 | Blanchard et al. |
| 6,959,712 | B2 | 11/2005 | Bereman et al. |
| 7,025,067 | B2 | 4/2006 | Chatterjee |
| 7,145,012 | B2 | 12/2006 | Carpino et al. |
| 7,192,771 | B2 | 3/2007 | Conkling et al. |
| 7,293,564 | B2 | 11/2007 | Perfetti et al. |
| 7,304,220 | B2 | 12/2007 | Conkling et al. |
| 7,390,835 | B2 | 6/2008 | Shah et al. |
| 7,398,783 | B2 | 7/2008 | Biggs et al. |
| 7,402,686 | B2 | 7/2008 | Duchek |
| 7,408,098 | B2 | 8/2008 | Conkling et al. |
| 7,425,670 | B2 | 9/2008 | Conkling et al. |
| 7,503,330 | B2 | 3/2009 | Borschke et al. |
| 7,524,867 | B2 | 4/2009 | Lange et al. |
| 7,538,071 | B2 | 5/2009 | Berger |
| 7,605,308 | B2 | 10/2009 | Conkling et al. |
| 7,611,858 | B1 | 11/2009 | Svetlov et al. |
| 7,645,925 | B2 | 1/2010 | Conkling et al. |
| 7,647,932 | B2 | 1/2010 | Cantrell et al. |
| 7,665,470 | B2 | 2/2010 | Mallmann et al. |
| 7,665,471 | B2 | 2/2010 | Mallmann et al. |
| 7,665,472 | B2 | 2/2010 | Mallmann et al. |
| 7,667,104 | B2 | 2/2010 | Mallmann et al. |
| 7,667,105 | B2 | 2/2010 | Mallmann et al. |
| 7,667,106 | B2 | 2/2010 | Mallmann et al. |
| 7,687,481 | B2 | 3/2010 | McElroy et al. |
| 7,700,368 | B2 | 4/2010 | Flockhart et al. |
| 7,726,320 | B2 | 6/2010 | Robinson et al. |
| 7,753,056 | B2 | 7/2010 | Borschke et al. |
| 7,795,503 | B2 | 9/2010 | Apuya et al. |
| 7,795,509 | B2 | 9/2010 | Conkling et al. |
| 7,816,143 | B2 | 10/2010 | Day et al. |
| 7,832,397 | B2 | 11/2010 | Lipowicz |

(56) References Cited

U.S. PATENT DOCUMENTS

| | | | |
|---|---|---|---|
| 7,836,897 | B2 | 11/2010 | Borschke et al. |
| 7,847,163 | B2 | 12/2010 | Mallmann et al. |
| 7,847,164 | B2 | 12/2010 | Mallmann et al. |
| 7,847,165 | B2 | 12/2010 | Mallmann et al. |
| 7,856,988 | B2 | 12/2010 | Yang et al. |
| 7,888,554 | B2 | 2/2011 | Kasukabe et al. |
| 7,999,107 | B2 | 8/2011 | Debenham et al. |
| 8,079,371 | B2 | 12/2011 | Robinson et al. |
| 8,136,533 | B2 | 3/2012 | Mua et al. |
| 8,205,622 | B2 | 6/2012 | Pan |
| 8,222,292 | B2 | 7/2012 | Goskonda et al. |
| 8,156,944 | B2 | 8/2012 | Han |
| 8,297,288 | B2 | 10/2012 | Yang et al. |
| 8,322,350 | B2 | 12/2012 | Lipowicz |
| 8,334,282 | B2 | 12/2012 | McElroy et al. |
| 8,337,908 | B2 | 12/2012 | Letzel et al. |
| 8,365,742 | B2 | 2/2013 | Hon |
| 8,393,331 | B2 | 3/2013 | Hon |
| 8,402,976 | B2 | 3/2013 | Fernando et al. |
| 8,410,341 | B2 | 4/2013 | Page et al. |
| 8,420,689 | B2 | 4/2013 | Muthuppalaniappan et al. |
| 8,431,607 | B2 | 4/2013 | Liu et al. |
| 8,445,034 | B1 | 5/2013 | Coles, Jr. |
| 8,476,309 | B2 | 7/2013 | Moore, II et al. |
| 8,490,628 | B2 | 7/2013 | Hon |
| 8,511,318 | B2 | 8/2013 | Hon |
| 8,518,653 | B2 | 8/2013 | Takkinen et al. |
| 8,528,569 | B1 | 9/2013 | Newton |
| 8,539,959 | B1 | 9/2013 | Scatterday |
| 8,624,083 | B2 | 1/2014 | Page et al. |
| 8,678,013 | B2 | 3/2014 | Crooks et al. |
| 8,722,691 | B2 | 5/2014 | He et al. |
| 8,733,346 | B2 | 5/2014 | Rinker |
| 8,752,557 | B2 | 6/2014 | Lipowicz |
| 8,759,101 | B2 | 6/2014 | Timko et al. |
| 8,791,329 | B2 | 7/2014 | Hashimoto et al. |
| 8,794,231 | B2 | 8/2014 | Thorens et al. |
| 8,808,734 | B2 | 8/2014 | Winnicki |
| 8,822,757 | B2 | 9/2014 | Page et al. |
| 8,846,409 | B2 | 9/2014 | Flockhart et al. |
| 8,851,081 | B2 | 10/2014 | Fernando et al. |
| 8,881,737 | B2 | 11/2014 | Collett et al. |
| 8,884,100 | B2 | 11/2014 | Page et al. |
| 8,887,737 | B2 | 11/2014 | Howell et al. |
| 8,893,724 | B2 | 11/2014 | Woodcock et al. |
| 8,895,078 | B2 | 11/2014 | Mueller |
| 8,895,472 | B2 | 11/2014 | Yang et al. |
| 8,899,238 | B2 | 12/2014 | Robinson et al. |
| 8,906,429 | B1 | 12/2014 | Kolsky |
| 8,910,630 | B2 | 12/2014 | Todd |
| 8,980,633 | B2 | 3/2015 | Timko et al. |
| 8,980,940 | B2 | 3/2015 | Rossi et al. |
| 8,980,941 | B2 | 3/2015 | Hospodor |
| 8,987,555 | B2 | 3/2015 | Hashimoto et al. |
| 8,997,753 | B2 | 4/2015 | Li et al. |
| 8,997,754 | B2 | 4/2015 | Tucker et al. |
| 9,004,073 | B2 | 4/2015 | Tucker et al. |
| 9,004,074 | B2 | 4/2015 | Nauryzbaev et al. |
| 9,022,040 | B2 | 5/2015 | Muiphy |
| 9,029,656 | B2 | 5/2015 | Hashimoto et al. |
| 9,050,631 | B2 | 6/2015 | Raichart |
| 9,055,617 | B2 | 6/2015 | Thorens et al. |
| 9,066,910 | B2 | 6/2015 | Rosenblatt et al. |
| 9,084,440 | B2 | 7/2015 | Zuber et al. |
| 9,095,554 | B2 | 8/2015 | Lewis et al. |
| 9,095,555 | B2 | 8/2015 | Winnicki |
| 9,102,948 | B2 | 8/2015 | Hashimoto et al. |
| 9,121,030 | B2 | 9/2015 | Page et al. |
| 9,133,468 | B2 | 9/2015 | Page et al. |
| 9,149,499 | B1 | 10/2015 | Robinson |
| 9,150,872 | B2 | 10/2015 | Page et al. |
| 9,157,089 | B2 | 10/2015 | Page et al. |
| 9,157,090 | B2 | 10/2015 | Page et al. |
| 9,168,278 | B2 | 10/2015 | Guy et al. |
| 9,175,052 | B2 | 11/2015 | Gerardi et al. |
| 9,175,302 | B2 | 11/2015 | Page et al. |
| 9,199,960 | B2 | 12/2015 | Ferri |
| 9,205,063 | B2 | 12/2015 | Guy et al. |
| 9,220,294 | B2 | 12/2015 | McCullough |
| 9,220,301 | B2 | 12/2015 | Banerjee et al. |
| 9,220,302 | B2 | 12/2015 | DePiano et al. |
| 9,259,449 | B2 | 2/2016 | Raderman |
| 9,277,770 | B2 | 3/2016 | DePiano et al. |
| 9,282,772 | B2 | 3/2016 | Tucker et al. |
| 9,289,014 | B2 | 3/2016 | Tucker et al. |
| 9,326,547 | B2 | 5/2016 | Tucker et al. |
| 9,326,967 | B2 | 5/2016 | Perry |
| 9,333,229 | B2 | 5/2016 | Bjorncrantz |
| 9,345,771 | B2 | 5/2016 | Goskonda et al. |
| 9,351,953 | B2 | 5/2016 | Stodola |
| 9,370,164 | B2 | 6/2016 | Lewis et al. |
| 9,376,367 | B2 | 6/2016 | Herkenroth et al. |
| 9,380,810 | B2 | 7/2016 | Rose et al. |
| 9,408,986 | B2 | 8/2016 | McCullough |
| 9,420,829 | B2 | 8/2016 | Thorens et al. |
| 9,422,346 | B2 | 8/2016 | Noguchi et al. |
| 9,422,532 | B2 | 8/2016 | Page et al. |
| 9,422,533 | B2 | 8/2016 | Page et al. |
| 9,423,152 | B2 | 8/2016 | Ampolini et al. |
| 9,439,452 | B2 | 9/2016 | Albino et al. |
| 9,439,454 | B2 | 9/2016 | Fernando et al. |
| 9,456,635 | B2 | 10/2016 | Tucker et al. |
| 9,462,754 | B2 | 10/2016 | Scott et al. |
| 9,474,306 | B2 | 10/2016 | Tucker et al. |
| 9,462,832 | B2 | 11/2016 | Lord |
| 9,497,999 | B2 | 11/2016 | Lord |
| 9,498,000 | B2 | 11/2016 | Kuczaj |
| 9,499,332 | B2 | 11/2016 | Fernando et al. |
| 9,504,723 | B2 | 11/2016 | Kolsky |
| PP27,475 | P2 | 12/2016 | Kubby |
| 9,510,623 | B2 | 12/2016 | Tucker et al. |
| 9,516,899 | B2 | 12/2016 | Plojoux et al. |
| 9,517,228 | B2 | 12/2016 | McElroy et al. |
| 9,532,597 | B2 | 1/2017 | Tucker et al. |
| 9,538,733 | B2 | 1/2017 | Jones |
| 9,546,362 | B2 | 1/2017 | Page et al. |
| 9,546,960 | B2 | 1/2017 | Pierce, III et al. |
| 9,551,003 | B2 | 1/2017 | Hashimoto et al. |
| 9,554,595 | B2 | 1/2017 | Buchberger |
| 9,554,598 | B2 | 1/2017 | Egoyants et al. |
| 9,555,198 | B2 | 1/2017 | Yang et al. |
| 9,556,142 | B2 | 1/2017 | Arnold |
| 9,560,883 | B2 | 2/2017 | Hawes |
| 9,565,865 | B2 | 2/2017 | Bhairam |
| 9,580,722 | B2 | 2/2017 | Qu et al. |
| 9,587,212 | B2 | 3/2017 | Winnicki et al. |
| 9,597,466 | B2 | 3/2017 | Henry, Jr. et al. |
| 9,603,388 | B2 | 3/2017 | Fernando et al. |
| 9,609,894 | B2 | 4/2017 | Abramov et al. |
| 9,611,460 | B2 | 4/2017 | Page et al. |
| 9,629,886 | B2 | 4/2017 | Franklin et al. |
| 9,632,069 | B2 | 4/2017 | Jackson, Jr. et al. |
| 9,642,317 | B2 | 5/2017 | Lewis et al. |
| 9,642,884 | B1 | 5/2017 | Skuratovich et al. |
| 9,669,002 | B2 | 6/2017 | Guy et al. |
| 9,670,133 | B2 | 6/2017 | Koch et al. |
| 9,670,216 | B2 | 6/2017 | Chen et al. |
| 9,674,894 | B2 | 6/2017 | Schneider et al. |
| 9,677,083 | B2 | 6/2017 | Timko et al. |
| 9,694,040 | B2 | 7/2017 | Scialdone |
| 9,701,978 | B2 | 7/2017 | Timko et al. |
| 9,717,277 | B2 | 8/2017 | Mironov |
| 9,717,683 | B1 | 8/2017 | Eck et al. |
| 9,719,103 | B2 | 8/2017 | Hashimoto et al. |
| 9,723,876 | B2 | 8/2017 | Cadieux et al. |
| 9,730,911 | B2 | 8/2017 | Verzura et al. |
| 9,732,350 | B2 | 8/2017 | Page et al. |
| 9,738,622 | B2 | 8/2017 | Dull et al. |
| 9,744,200 | B1 | 8/2017 | Tucker et al. |
| 9,752,156 | B2 | 9/2017 | Page et al. |
| 9,765,308 | B2 | 9/2017 | Page et al. |
| 9,775,380 | B2 | 10/2017 | Fernando et al. |
| 9,781,952 | B2 | 10/2017 | Rinker et al. |
| 9,788,571 | B2 | 10/2017 | Conner et al. |

(56) References Cited

U.S. PATENT DOCUMENTS

| | | |
|---|---|---|
| 9,808,494 B2 | 11/2017 | Barringer |
| 9,814,258 B2 | 11/2017 | Pandolfino |
| 9,814,263 B2 | 11/2017 | Cochand et al. |
| 9,814,775 B2 | 11/2017 | Rossi et al. |
| 9,815,810 B1 | 11/2017 | Ogilvie et al. |
| 9,817,007 B2 | 11/2017 | Perez |
| 9,820,512 B2 | 11/2017 | Mironov et al. |
| 9,822,384 B2 | 11/2017 | Poulos et al. |
| 9,823,259 B1 | 11/2017 | Nichols |
| 9,834,780 B2 | 12/2017 | Hashimoto et al. |
| 9,844,234 B2 | 12/2017 | Thorens et al. |
| 9,848,644 B2 | 12/2017 | Plunkett et al. |
| 9,848,655 B2 | 12/2017 | Fernando et al. |
| 9,848,656 B2 | 12/2017 | Tucker et al. |
| 9,854,836 B2 | 1/2018 | Lipowicz |
| 9,854,839 B2 | 1/2018 | Tucker et al. |
| 9,854,844 B2 | 1/2018 | Plojoux et al. |
| 9,856,487 B2 | 1/2018 | Hashimoto et al. |
| 9,867,859 B2 | 1/2018 | Raderman |
| 9,877,508 B2 | 1/2018 | Kane |
| 9,877,511 B2 | 1/2018 | Li et al. |
| 9,877,516 B2 | 1/2018 | Tucker et al. |
| 9,879,272 B2 | 1/2018 | Page et al. |
| 9,879,292 B2 | 1/2018 | Winnicki et al. |
| 9,883,700 B2 | 2/2018 | Holzherr et al. |
| 9,888,703 B2 | 2/2018 | Bhairam |
| 9,888,719 B2 | 2/2018 | Cadieux et al. |
| 9,901,112 B2 | 2/2018 | Mei et al. |
| 9,901,607 B2 | 2/2018 | Silen |
| 9,913,868 B1 | 3/2018 | Alfiere |
| 9,918,496 B2 | 3/2018 | Kane et al. |
| 9,918,497 B2 | 3/2018 | Lord |
| 9,930,910 B2 | 4/2018 | Gindrat |
| 9,937,218 B2 | 4/2018 | Towle |
| 9,937,219 B2 | 4/2018 | Raderman |
| 9,943,108 B2 | 4/2018 | Lord |
| 9,949,507 B2 | 4/2018 | Flick |
| 9,955,724 B2 | 5/2018 | Lord |
| 9,955,735 B2 | 5/2018 | Lin et al. |
| 9,956,173 B1 | 5/2018 | Nordahl |
| 9,956,174 B1 | 5/2018 | Nordahl |
| 9,956,498 B1 | 5/2018 | Tucker |
| 9,961,939 B2 | 5/2018 | Reevell |
| 9,961,941 B2 | 5/2018 | Tucker et al. |
| 9,968,134 B2 | 5/2018 | Liu |
| 9,974,329 B2 | 5/2018 | Buehler et al. |
| 9,974,335 B2 | 5/2018 | Lord |
| 9,974,340 B2 | 5/2018 | Liu |
| 9,974,743 B2 | 5/2018 | Rose et al. |
| 9,974,821 B2 | 5/2018 | Kennedy |
| 9,976,153 B2 | 5/2018 | Page et al. |
| 9,980,511 B2 | 5/2018 | Liu |
| 9,980,519 B2 | 5/2018 | Xiang |
| 9,980,521 B2 | 5/2018 | Buehler et al. |
| 9,980,523 B2 | 5/2018 | Abramov et al. |
| 9,986,760 B2 | 6/2018 | Macko et al. |
| 9,986,761 B2 | 6/2018 | Thorens et al. |
| 9,986,763 B2 | 6/2018 | Liu |
| 9,986,765 B2 | 6/2018 | Batista |
| 9,986,766 B2 | 6/2018 | Batista |
| 9,986,767 B2 | 6/2018 | Batista et al. |
| 9,987,248 B1 | 6/2018 | Lowe et al. |
| 9,987,253 B2 | 6/2018 | McElroy et al. |
| 9,987,567 B1 | 6/2018 | Ko |
| 9,988,640 B2 | 6/2018 | Page et al. |
| 9,988,763 B2 | 6/2018 | Ramaratnam et al. |
| 9,993,023 B2 | 6/2018 | Tucker et al. |
| 9,994,860 B2 | 6/2018 | Hashimoto et al. |
| 9,999,245 B1 | 6/2018 | Zhu |
| 9,999,247 B2 | 6/2018 | Ruscio et al. |
| 9,999,250 B2 | 6/2018 | Minskoff et al. |
| 9,999,253 B2 | 6/2018 | Li et al. |
| 9,999,256 B2 | 6/2018 | Abramov et al. |
| 10,003,372 B2 | 6/2018 | Stanimirovic et al. |
| 10,004,261 B2 | 6/2018 | Li et al. |
| 10,004,268 B2 | 6/2018 | Liu |
| 10,004,275 B2 | 6/2018 | Li et al. |
| 10,010,110 B2 | 7/2018 | Metrangolo et al. |
| 10,010,112 B2 | 7/2018 | Silvestrini et al. |
| 10,010,113 B2 | 7/2018 | Zuber et al. |
| 10,011,804 B2 | 7/2018 | Mancosky |
| 10,015,986 B2 | 7/2018 | Cadieux et al. |
| 10,021,838 B1 | 7/2018 | Gustafik |
| 10,021,915 B2 | 7/2018 | Cadieux et al. |
| 10,028,531 B2 | 7/2018 | Clements et al. |
| 10,028,533 B2 | 7/2018 | Fursa et al. |
| 10,028,535 B2 | 7/2018 | Mironov |
| 10,028,537 B1 | 7/2018 | Hawes et al. |
| 10,028,618 B1 | 7/2018 | Benson |
| 10,028,904 B2 | 7/2018 | Smith et al. |
| 10,030,249 B2 | 7/2018 | Page et al. |
| 10,036,574 B2 | 7/2018 | Brereton et al. |
| 10,039,321 B2 | 8/2018 | Verleur et al. |
| 10,039,322 B2 | 8/2018 | Schiff et al. |
| 10,041,084 B2 | 8/2018 | Page et al. |
| 10,058,130 B2 | 8/2018 | Monsees et al. |
| 10,070,669 B2 | 9/2018 | Monsees et al. |
| 10,076,139 B2 | 9/2018 | Monsees et al. |
| 10,104,915 B2 | 10/2018 | Bowen et al. |
| 10,111,470 B2 | 10/2018 | Monsees et al. |
| 10,113,174 B2 | 10/2018 | Kudithipudi et al. |
| 10,159,282 B2 | 12/2018 | Monsees et al. |
| 10,201,190 B2 | 2/2019 | Monsees et al. |
| 10,279,934 B2 | 5/2019 | Christensen et al. |
| 10,369,178 B2 | 8/2019 | Greenbaum et al. |
| 2002/0108151 A1 | 8/2002 | Conkling et al. |
| 2002/0197688 A1 | 12/2002 | Pandolfino |
| 2003/0018997 A1 | 1/2003 | Conkling et al. |
| 2003/0131857 A1 | 7/2003 | Kim et al. |
| 2003/0140366 A1 | 7/2003 | Conkling et al. |
| 2003/0200975 A1 | 10/2003 | Rosen et al. |
| 2004/0094170 A1 | 5/2004 | Zho et al. |
| 2004/0103454 A1 | 5/2004 | Conkling et al. |
| 2004/0144397 A1 | 7/2004 | Conkling |
| 2004/0168211 A1 | 8/2004 | Conkling et al. |
| 2005/0000531 A1 | 1/2005 | Shi |
| 2005/0072047 A1 | 4/2005 | Conkling et al. |
| 2005/0161056 A1 | 7/2005 | Conkling |
| 2005/0263165 A1 | 12/2005 | Oh et al. |
| 2005/0263166 A1 | 12/2005 | Oh et al. |
| 2006/0057723 A1 | 3/2006 | Conkling et al. |
| 2006/0060211 A1 | 3/2006 | Conkling |
| 2006/0191035 A1 | 8/2006 | Conkling et al. |
| 2006/0191036 A1 | 8/2006 | Conkling et al. |
| 2006/0191039 A1 | 8/2006 | Conkling et al. |
| 2006/0191547 A1 | 8/2006 | Conkling |
| 2006/0191549 A1 | 8/2006 | Conkling |
| 2006/0195936 A1 | 8/2006 | Conkling et al. |
| 2006/0200872 A1 | 9/2006 | Conkling et al. |
| 2006/0236434 A1 | 10/2006 | Conkling et al. |
| 2006/0242730 A1 | 10/2006 | Conkling et al. |
| 2006/0243290 A1 | 11/2006 | Reich et al. |
| 2007/0011774 A1 | 1/2007 | Conkling et al. |
| 2007/0016975 A1 | 1/2007 | Conkling et al. |
| 2007/0034220 A1 | 2/2007 | Pandolfino |
| 2008/0029106 A1* | 2/2008 | Mishra ............... A24B 15/282 131/108 |
| 2008/0120737 A1 | 5/2008 | Hashimoto et al. |
| 2008/0292735 A1 | 11/2008 | Hashimoto et al. |
| 2009/0055964 A1 | 2/2009 | Gelesko et al. |
| 2009/0114235 A1 | 5/2009 | Mallmann et al. |
| 2009/0117212 A1 | 5/2009 | Mallmann et al. |
| 2009/0119788 A1 | 5/2009 | Mallmann et al. |
| 2009/0119789 A1 | 5/2009 | Mallmann et al. |
| 2009/0119790 A1 | 5/2009 | Mallmann et al. |
| 2009/0119791 A1 | 5/2009 | Mallmann et al. |
| 2009/0119806 A1 | 5/2009 | Mallmann et al. |
| 2009/0210958 A1 | 8/2009 | Page et al. |
| 2009/0230117 A1 | 9/2009 | Fernando et al. |
| 2010/0132063 A1 | 5/2010 | Mallmann et al. |
| 2010/0132064 A1 | 5/2010 | Mallmann et al. |
| 2010/0138949 A1 | 6/2010 | Mallmann et al. |
| 2011/0126322 A1 | 5/2011 | Fernandez et al. |
| 2011/0147486 A1 | 6/2011 | Greim et al. |

(56) References Cited

U.S. PATENT DOCUMENTS

| | | |
|---|---|---|
| 2011/0155153 A1 | 6/2011 | Thorens et al. |
| 2013/0048001 A1 | 2/2013 | Williams |
| 2013/0309749 A1 | 11/2013 | Page et al. |
| 2013/0318661 A1 | 11/2013 | Page et al. |
| 2014/0020693 A1 | 1/2014 | Cochand et al. |
| 2014/0020698 A1 | 1/2014 | Fiebelkorn |
| 2014/0053831 A1 | 2/2014 | Leamon et al. |
| 2014/0076337 A1 | 3/2014 | Woodman et al. |
| 2014/0202476 A1 | 7/2014 | Egoyants et al. |
| 2014/0271733 A1 | 9/2014 | Kobal et al. |
| 2014/0283165 A1 | 9/2014 | Kudithipudi et al. |
| 2014/0298535 A1 | 10/2014 | Page et al. |
| 2014/0299141 A1 | 10/2014 | Flick |
| 2014/0301721 A1 | 10/2014 | Ruscio et al. |
| 2014/0305448 A1 | 10/2014 | Plojoux et al. |
| 2014/0305449 A1 | 10/2014 | Plojoux et al. |
| 2014/0321837 A1 | 10/2014 | Flick |
| 2014/0338680 A1 | 11/2014 | Abramov et al. |
| 2014/0353856 A1 | 12/2014 | Dubief |
| 2014/0356607 A1 | 12/2014 | Woodcock |
| 2014/0360515 A1 | 12/2014 | Vasiliev et al. |
| 2014/0366899 A1 | 12/2014 | Plojoux et al. |
| 2014/0366900 A1 | 12/2014 | Plojoux et al. |
| 2015/0020832 A1 | 1/2015 | Greim et al. |
| 2015/0027474 A1 | 1/2015 | Zuber et al. |
| 2015/0040925 A1 | 2/2015 | Saleem et al. |
| 2015/0082484 A1 | 3/2015 | Howe et al. |
| 2015/0107610 A1 | 4/2015 | Metrangolo et al. |
| 2015/0107611 A1 | 4/2015 | Metrangolo et al. |
| 2015/0163859 A1 | 6/2015 | Schneider et al. |
| 2015/0173319 A1 | 6/2015 | Frederick et al. |
| 2015/0181934 A1 | 7/2015 | Lyubomirskiy et al. |
| 2015/0181935 A1 | 7/2015 | Lyubomirskiy et al. |
| 2015/0181936 A1 | 7/2015 | Lyubomirskiy et al. |
| 2015/0181937 A1 | 7/2015 | Dubief et al. |
| 2015/0182707 A1 | 7/2015 | Maharajh |
| 2015/0203859 A1 | 7/2015 | Page et al. |
| 2015/0208727 A1 | 7/2015 | Kuczaj |
| 2015/0218575 A1 | 8/2015 | Hashimoto et al. |
| 2015/0223520 A1 | 8/2015 | Phillips et al. |
| 2015/0264979 A1 | 9/2015 | Thorens et al. |
| 2015/0272219 A1 | 10/2015 | Hatrick et al. |
| 2015/0322451 A1 | 11/2015 | Kidithipudi et al. |
| 2016/0002649 A1 | 1/2016 | Kidithipudi et al. |
| 2016/0032299 A1 | 2/2016 | Hashimoto et al. |
| 2016/0044963 A1 | 2/2016 | Saleem |
| 2016/0050968 A1 | 2/2016 | Williams |
| 2016/0060645 A1 | 3/2016 | Page et al. |
| 2016/0060646 A1 | 3/2016 | Page et al. |
| 2016/0073675 A1 | 3/2016 | Page et al. |
| 2016/0081395 A1 | 3/2016 | Thorens et al. |
| 2016/0032298 A1 | 4/2016 | Hashimoto et al. |
| 2016/0130601 A1 | 5/2016 | Page et al. |
| 2016/0174610 A1 | 6/2016 | Kuczaj |
| 2016/0213063 A1 | 7/2016 | Ajithkumar et al. |
| 2016/0227839 A1 | 8/2016 | Zuber et al. |
| 2016/0255879 A1 | 9/2016 | Paprocki et al. |
| 2016/0270435 A1 | 9/2016 | Benjak et al. |
| 2016/0286862 A1 | 10/2016 | Silvetrini |
| 2016/0295915 A1 | 10/2016 | Jochnowitz et al. |
| 2016/0295921 A1 | 10/2016 | Mironov et al. |
| 2016/0302488 A1 | 10/2016 | Fernando et al. |
| 2016/0345634 A1 | 12/2016 | Fernando et al. |
| 2016/0362702 A1 | 12/2016 | de Bont et al. |
| 2016/0374387 A1 | 12/2016 | Adams et al. |
| 2017/0009249 A1 | 1/2017 | Goossens et al. |
| 2017/0033568 A1 | 2/2017 | Holzherr |
| 2017/0044564 A1 | 2/2017 | Page et al. |
| 2017/0055566 A1 | 3/2017 | Albino et al. |
| 2017/0055574 A1 | 3/2017 | Kaufman et al. |
| 2017/0055580 A1 | 3/2017 | Blandino et al. |
| 2017/0055583 A1 | 3/2017 | Blandino et al. |
| 2017/0055584 A1 | 3/2017 | Blandino et al. |
| 2017/0079322 A1 | 3/2017 | Li et al. |
| 2017/0095002 A1 | 4/2017 | Silvestrini |
| 2017/0137835 A1 | 5/2017 | Qu et al. |
| 2017/0143039 A1 | 5/2017 | Buehler et al. |
| 2017/0143041 A1 | 5/2017 | Batista et al. |
| 2017/0145432 A1 | 5/2017 | Hashimoto et al. |
| 2017/0164657 A1 | 6/2017 | Batista |
| 2017/0164659 A1 | 6/2017 | Schneider et al. |
| 2017/0166913 A1 | 6/2017 | Hashimoto et al. |
| 2017/0172208 A1 | 6/2017 | Mironov |
| 2017/0181472 A1 | 6/2017 | Rui Nuno et al. |
| 2017/0196262 A1 | 7/2017 | Brereton et al. |
| 2017/0224019 A1 | 8/2017 | Arkadiusz |
| 2017/0224024 A1 | 8/2017 | Jochnowitz et al. |
| 2017/0231267 A1 | 8/2017 | Shi et al. |
| 2017/0231281 A1 | 8/2017 | Hatton et al. |
| 2017/0231282 A1 | 8/2017 | Bowen et al. |
| 2017/0231285 A1 | 8/2017 | Holzherr et al. |
| 2017/0233114 A1 | 8/2017 | Christensen et al. |
| 2017/0273358 A1 | 9/2017 | Batista |
| 2017/0306341 A1 | 10/2017 | Timko et al. |
| 2017/0321223 A1 | 11/2017 | Page et al. |
| 2017/0347715 A1 | 12/2017 | Mironov et al. |
| 2017/0354184 A1 | 12/2017 | Mironov et al. |
| 2017/0360093 A1 | 12/2017 | Fernando |
| 2017/0360095 A1 | 12/2017 | Batista |
| 2017/0360096 A1 | 12/2017 | Silvestrini |
| 2017/0367409 A1 | 12/2017 | Thorens et al. |
| 2018/0000160 A1 | 1/2018 | Taschner et al. |
| 2018/0007971 A1 | 1/2018 | Plojoux et al. |
| 2018/0014573 A1 | 1/2018 | Silvestrini et al. |
| 2018/0042304 A1 | 2/2018 | Hogwood et al. |
| 2018/0042305 A1 | 2/2018 | Hogwood et al. |
| 2018/0043113 A1 | 2/2018 | Hogwood et al. |
| 2018/0049471 A1 | 2/2018 | Holoubek et al. |
| 2018/0049477 A1 | 2/2018 | Suzuki et al. |
| 2018/0077965 A1 | 3/2018 | Lipowicz |
| 2018/0077967 A1 | 3/2018 | Hatton et al. |
| 2018/0104425 A1 | 4/2018 | Hogwood et al. |
| 2018/0110262 A1 | 4/2018 | Batista et al. |
| 2018/0125026 A1 | 5/2018 | de Godoy et al. |
| 2018/0132532 A1 | 5/2018 | Batista |
| 2018/0160734 A1 | 6/2018 | Batista et al. |
| 2018/0168223 A1 | 6/2018 | Zinovik et al. |
| 2018/0185604 A1 | 7/2018 | Hassenpflug et al. |
| 2018/0207376 A1 | 7/2018 | Buehler et al. |
| 2018/0213843 A1 | 8/2018 | Mironov |
| 2018/0317557 A1 | 11/2018 | Monsees et al. |
| 2019/0037924 A1 | 2/2019 | Habicht et al. |

FOREIGN PATENT DOCUMENTS

| | | |
|---|---|---|
| WO | 9856923 A1 | 12/1998 |
| WO | 0067558 A1 | 11/2000 |
| WO | 0218607 A2 | 3/2002 |
| WO | 02100199 A2 | 12/2002 |
| WO | 2007075027 A1 | 7/2007 |
| WO | 2008008844 A2 | 1/2008 |
| WO | 2008020333 A2 | 2/2008 |
| WO | 2009061421 A1 | 5/2009 |
| WO | 2009061422 A1 | 5/2009 |
| WO | 2009061437 A1 | 5/2009 |
| WO | 2009063312 A2 | 5/2009 |
| WO | 2014134354 A1 | 9/2014 |
| WO | 2015085299 A1 | 6/2015 |
| WO | 2015157359 A1 | 10/2015 |
| WO | 2015196275 A1 | 12/2015 |
| WO | 2016004193 A1 | 1/2016 |
| WO | 2016179356 A1 | 11/2016 |
| WO | 2016210303 A1 | 12/2016 |
| WO | 2017096254 A1 | 6/2017 |
| WO | 2017097840 A1 | 6/2017 |
| WO | 2017194764 A1 | 11/2017 |
| WO | 2017198838 A1 | 11/2017 |
| WO | 2017212284 A1 | 12/2017 |
| WO | 2018019786 A1 | 2/2018 |
| WO | 2018019855 A1 | 2/2018 |
| WO | 2018045140 A1 | 3/2018 |
| WO | 2018057385 A2 | 3/2018 |
| WO | 2018069673 A1 | 4/2018 |
| WO | 2018069675 A1 | 4/2018 |

(56) References Cited

FOREIGN PATENT DOCUMENTS

| WO | 2018069676 A1 | 4/2018 |
|---|---|---|
| WO | 2018073376 A1 | 4/2018 |
| WO | 2018083037 A1 | 5/2018 |
| WO | 2018087165 A1 | 5/2018 |
| WO | 2018100366 A2 | 6/2018 |
| WO | 2018122978 A1 | 7/2018 |
| WO | 2018127417 A1 | 7/2018 |
| WO | 2018130391 A1 | 7/2018 |
| WO | 2018134159 A1 | 7/2018 |
| WO | 2018138072 A1 | 8/2018 |
| WO | 2018138749 A1 | 8/2018 |
| WO | 2018138750 A1 | 8/2018 |
| WO | 2018138751 A1 | 8/2018 |

OTHER PUBLICATIONS

United States Plant Variety Protection Certificate No. 200100039, Vector 21-41 Tobacco (26 pages total).
Von Weymarn, et al., "Quantitation of the minor tobacco alkaloids nornicotine, anatabine, and anabasine in smokers' urine by high throughput liquid chromatography mass spectrometry", Chem Res Toxicol, Mar. 21, 2016; vol. 29, No. 3 (20 pages total).
Walker, et al., "The combined effect of very low nicotine content cigarettes, used as an adjunct to usual Quitline care (nicotine replacement therapy and behavioural support), on smoking cessation: a randomized controlled trial", Addiction, 2012, vol. 107, No. 10 (11 pages total).
Bingwu, Wang, "Factors in Nicotine Biosynthesis in Tobacco", (Under the direction of Rongda Qu), 2011, Thesis (131 pages total).
Xie, et al., "Biotechnology: A Tool for Reduced-Risk Tobacco Products—The Nicotine Experience From Test Tube to Cigarette Pack", Recent Advances in Tobacco Science, 2004, pp. 17-37, vol. 30 (21 pages total).
Aizpurua-Olaizola, et al., "Identification and quantification of cannabinoids in Cannabis sativa L. plants by high performance liquid chromatography-mass spectrometry", Anal Bioanal Chem, 2014, pp. 7549-7560, vol. 406 (12 pages total).
Aycock, et al., "Registration of LAMD 609 Tobacco Germplasm", Crop Science, May-Jun. 1998, p. 904, vol. 38, No. GP-52, PI 599689 (1 page total).
Ayers, et al., "A General Procedure for the Enantioselective Synthesis of the Minor Tobacco Alkaloids Nornicotine, Anabasine, and Anatabine", The AAPS Journal, 2005; vol. 7, No. 3, article 75, (http://www.aapsj.org)) (7 pages total).
Becker, et al., "A randomized trial of nicotine replacement therapy in combination with reduced-nicotine cigarettes for smoking cessation", Nicotine & Tobacco Research, Jul. 2008, pp. 1139-1148, vol. 10, No. 7 (10 pages total).
Melody M. Bomgardner, "CRISPR: A new toolbox for better crops", Chemical & Engineering News, 2017, pp. 30-34, vol. 95, No. 24 (12 pages total).
Bortesi, et al., "The CRISPR/Cas9 system for plant genome editing and beyond", Biotechnology Advances, 2015, pp. 41-52, vol. 33, No. 10 (12 pages total).
Burns, et al., "Mandated lowering of toxicants in cigarette smoke: a description of the World Health Organization TobReg proposal", Tobacco Control, 2008, pp. 132-141, vol. 17 (11 pages total).
Carvalho, et al., "Designing microorganisms for heterologous biosynthesis of cannabinoids", FEMS Yeast Research, 2017, pp. 1-11, vol. 17, No. 4 (11 pages total).
James F. Chaplin, "Registration of LAFC 53 Tobacco Germplasm", Crop Science, Mar.-Apr. 1975, p. 282, vol. 15, No. GP 13 (1 page total).
Chintapakorn, et al., "Antisense-mediated down-regulation of putrescine N-methyltransferase activity in transgenic Nicotiana tabacum L. can lead to elevated levels of anatabine at the expense of nicotine", Plant Molecular Biology, 2003, pp. 87-105, vol. 53 (19 pages total).
Dalton, et al., "Effects of down-regulating ornithine decarboxylase upon putrescine-associated metabolism and growth in Nicotiana tabacum L.", Journal of Experimental Botany, 2016, pp. 3367-3381, vol. 67, No. 11 (15 pages total).
Deboer, et al., "RNAi-mediated down-regulation of ornithine decarboxylase (ODC) leads to reduced nicotine and increased anatabine levels in transgenic Nicotiana tabacum L.", Phytochemistry, 2011, pp. 344-355, vol. 72 (12 pages total).
Donny, et al., "Randomized Trial of Reduced-Nicotine Standards for Cigarettes", New England Journal of Medicine; 2015, pp. 1340-1349, vol. 373 (10 pages total).
Farsalinos, et al., "Nicotine Delivery to the Aerosol of a Heat-Not-Burn Tobacco Product: Comparison With a Tobacco Cigarette and E-Cigarettes", Nicotine & Tobacco Research, 2017, pp., 1-6, doi: 10.1093/ntr/ntx138 (6 pages total).
Fellermeier, et al., "Prenylation of olivetolate by a hemp transferase yields cannabigerolic acid, the precursor of tetrahydrocannabinol", FEBS Letters; 1998, pp. 283-285 vol. 427 (3 pages total).
Gagne, et al., "Identification of olivetolic acid cyclase from Cannabis sativa reveals a unique catalytic route to plant polyketides", Proc Natl Acad Sci USA; Jul. 31, 2012, pp. 12811-12816, vol. 109, No. 31 (6 pages total).
Gaj, et al., "ZFN, TALEN and CRISPR/Cas-based methods for genome engineering", Trends in Biotechnology, 2013, pp. 1-20, vol. 31, No. 7 (20 pages total).
Hatsukami, et al., "Reduced nicotine content cigarettes: effects on toxicant exposure, dependence and cessation", Addiction, 2010, pp. 343-355, vol. 105 (13 pages total).
Hall, et al., "Differential Effects of Non-Nicotine Tobacco Constituent Compounds on Nicotine Self-Administration in Rats", Pharmacol Biochem Behav., May 2014; pp. 1-16, vol. 120 (16 pages total).
Heatherton, et al., "The Fagerström Test for Nicotine Dependence: a revision of the Fagerström Tolerance Questionnaire", British Journal of Addiction, 1991, pp. 1119-1127, vol. 86 (10 pages total).
Hibi, et al., "Gene Expression in Tobacco Low-Nicotine Mutants", The Plant Cell, May 1994, pp. 723-735, vol. 6 (14 pages total).
Ron C. Hogg PhD, "Contribution of Monoamine Oxidase Inhibition to Tobacco Dependence: A Review of the Evidence", Nicotine & Tobacco Research, 2016; pp. 509-523 vol. 18, No. 5 (15 pages total).
"Tobacco Heating System (IQOS)", Briefing Document, Dec. 2017, Prepared by Philip Morris Products S.A. for the Jan. 24-25, 2018 Tobacco Products Scientific Advisory Committee Meeting of the Center for Tobacco Products of the U.S. Food & Drug Administration (89 pages total).
Lanteri, et al., "Inhibition of Monoamine Oxidases Desensitizes 5-HT$_{1A}$ Autoreceptors and Allows Nicotine to Induce a Neurochemical and Behavioral Sensitization", J. Neurosci., Jan. 28, 2009, pp. 987-997, vol. 29, No. 4 (11 pages total).
Legg, et al., "Inheritance of percent total alkaloids in Nicotiana tabacum L. Populations derived from crosses of low alkaloid lines with burley and flue-cured varieties", Journal of Heredity, 1969, pp. 213-217, vol. 60, No. 4.
Legg, et al., "Registration of LA Burley 21 Tobacco Germplasm", Crop Science, Mar.-Apr. 1970, p. 212, vol. 10, No. GP 8 (1 page total).
Lewis, et al., "Transgenic and Mutation-Based Suppression of a Berberine Bridge Enzyme-Like (BBL) Gene Family Reduces Alkaloid Content in Field-Grown Tobacco", PLOS One, Feb. 17, 2015, vol. 10, No. 2, DOI:10.1371 (17 pages total).
Ramsey S. Lewis, "Potential Mandated Lowering of Nicotine Levels in Cigarettes: A Plant Perspective", The Society for Research on Nicotine and Tobacco, 2018, doi: 10.1093/ntr/nty022 (15 pages total).
Lisko, et al., "Application of GC-MS/MS for the Analysis of Tobacco Alkaloids in Cigarette Filler and Various Tobacco Species", Anal Chem., Mar. 19, 2013; vol. 85, No. 6 (15 pages total).
Harry O. Lopez, "Developing Non-GMO Tobacco Cultivars with Lower Alkaloid Content Using a Reverse Genetics Strategy", Thesis, 2011 (120 pages total).
Morton, et al., "Cigarette smoke chemistry market maps under Massachusetts Department of Public Health smoking conditions", Regulatory Toxicology and Pharmacology, 2008, pp. 1-30, vol. 51, No. 1, doi: 10.1016/j.yrtph.2008.03.001 (30 pages total).

(56) References Cited

OTHER PUBLICATIONS

Mudge, et al., "Leaner and greener analysis of cannabinoids", Analytical and Bioanalytical Chemistry, 2017, pp. 3153-3163, vol. 409, No. 12 (11 pages total).
Nekrasov, et al., "Targeted mutagenesis in the model plant Nicotiana benthamiana using Cas9 RNA-guided endonuclease", Aug. 2013, pp. 691-693, vol. 31, No. 8 (3 pages total).
Stratton, et al.,"Public health consequences of e-cigarettes", National Academies of Sciences, Engineering, and Medicine, The National Academies Press, 2018, Washington, DC, doi: https://doi.org/10.17226/24952 (613 pages total).
National Institute on Drug Abuse (NIDA) Drug Supply Program, Notice Number: NOT-DA-14-004, Notice of Availability of Nicotine Research Cigarettes (4 pages total).
Patel, et al., "Qualitative and quantitative measurement of cannabinoids in cannabis using modified HPLC/DAD method", Journal Pharmaceutical and Biomedical Analysis, 2017, pp. 15-23, vol. 146 (9 pages total).
Reed, et al., "The A and B loci of Nicotiana tabacum have non-equivalent effects on the mRNA levels of four alkaloid biosynthetic genes", *Plant Science*, 2004, pp. 1123-1130, vol. 167, No. 5 (8 pages total).
Baliga et al., "Project 1904: Tobacco Physiology and Biochemistry," Philip Morris Research; Accession No. 87-049; Mar. 27, 1987 (47 pages total).
"Alkaloid Reduced Tobacco (ART) Program," Philip Morris USA; DOC CODE: P0622, Sep. 1, 1994, (33 pages total).
Rezaishiraz, et al., "Treating smokers before the quit date: Can nicotine patches and denicotinized cigarettes reduce cravings?", *Nicotine & Tobacco Research*, Nov. 2007, pp. 1139-1146, vol. 9, No. 11 (8 pages total).
"Table II—1985 Special R&D Tobaccos—Low Nicotine Tobacco 1985 Crop Chemical Analysis," R.J. Reynolds Tobacco Company; 1985 (1 page total).
Sirikantaramas, et al., "The Gene Controlling Marijuana Psychoactivity, Molecular Cloning and Heterologous Expression of $\Delta^1$-Tetrahydrocannabinolic Acid Synthase From *Cannabis Sativa* L.", *The Journal of Biological Chemistry*, 2004, pp. 39767-39774, vol. 279, No. 38 (9 pages total).
Sisson, et al., "Alkaloid Composition of the *Nicotiana* Species", Beiträge zur Tabakforschung International, Jun.-Jul. 1990, pp. 327-339, vol. 14, No. 6 (13 pages total).
Stout, et al., "The hexanoyl-CoA precursor for cannabinoid biosynthesis is formed by an acyl-activating enzyme in Cannabis sativa trichomes", *The Plant Journal*, 2012, p. 1-13, vol. 71 (13 pages total).
Taura, et al., "Cannabidiolic-acid synthase, the chemotype-determining enzyme in the fiber-type Cannabis sativa", *FEBS Letters*; 2007, pp. 2929-2934, vol. 581 (6 pages total).
Taura, et al., "Characterization of olivetol synthase, a polyketide synthase putatively involved in cannabinoid biosynthetic pathway", *FEBS Letters*; 2009, p. 2061-2066, vol. 583 (6 pages total).
"Tobacco Production, Chemistry and Technology", 1999, Davis DL and Nielson, MT (Editors), *Blackwell Publishing* (12 pages total).
Hatsukami, et al., "Effect of Immediate vs Gradual Reduction in Nicotine Content of Cigarettes on Biomarkers of Smoke Exposure a Randomized Clinical Trial", JAMA, Sep. 4, 2018, p. 880-891, vol. 320, No. 9 (12 pages total).
Donny, E. C., Denlinger, R. L., Tidey, J. W., Koopmeiners, J. S., Benowitz, N. L., Vandrey, R. G., . . . Hatsukami, D. K. (Oct. 1, 2015). Randomized Trial of Reduced-Nicotine Standards for Cigarettes. New England Journal of Medicine, 373(14), 1340-1349. doi:10.1056/nejmsa1502403.
Russell, Michael A. H.; "Public Health and Levels of Nicotine: Should Nicotine Levels in Cigarettes Be Minimized or Maximized?"; Nicotine and Public Health. American Public Health Organization, 2000; Chapter 15 (16 pages total).
John Alden Cigarettes Advertisement; http://tobacco.stanford.edu/tobaCco_main/images_body.php?token1=frn_img12123.php; 1952.
Armitage, A. K., et al.; "Evaluation of a low to middle tar/medium nicotine cigarette designed to maintain nicotine delivery to the smoker"; Psychopharmacology, 1988, vol. 96, pp. 447-453.
Joseph Pandolfino; "Reducing the Adverse Health Impact of Cigarettes on Smokers Who Will Not or Cannot Abstain Through Modification of Leaf Nicotine Content"; Evaluating the Science Evidence for Potential Reduced-Risk Tobacco Products; Core Committee Meeting; Oct. 19-20, 2005; (50 pages total); Bethesda, MD.
Hajek, Peter Ph.D., et al.; "A Randomized Trial of E-Cigarettes versus Nicotine-Replacement Therapy"; *New England Journal of Medicine*, vol. 380, No. 7, Feb. 14, 2019, pp. 629-637.
Fagerstrom, Karl-Olov; "Effects of a Nicotine-Enriched Cigarette on Nicotine Titration, Daily Cigarette Consumption, and Levels of Carbon Monoxide, Cotinine, and Nicotine"; Psychopharmacology, 1982, vol. 77, pp. 164-167.
D. Layten Davis and Mark T. Nielsen; "Cigarette Manufacture: Cigarette Design & Materials"; Tobacco Production, Chemistry and Technology, 1999, pp. 377-379.
Zhang, Xiaotao, et al.; "Simultaneous determination of tobacco minor alkaloids and tobacco-specific nitrosamines in mainstream smoke by dispersive solid-phase extraction coupled with ultra-performance liquid chromatography/tandem orbitrap mass spectrometry"; Rapid Commun Mass Spectrom, 2018, vol. 32, pp. 1791-1798.

\* cited by examiner ic products, and (ii) enjoy the pleasurable combined effects of nicotine, cannabinoids and combinations of other compounds through ready-to-vape and ready-to-smoke precision pods without exposure to other tobacco compounds.

ARTICLES AND FORMULATIONS FOR SMOKING PRODUCTS AND VAPORIZERS

CROSS REFERENCE TO RELATED APPLICATIONS

The present application is a continuation application of U.S. patent application Ser. No. 16/569,318, filed on Sep. 12, 2019, in the U.S. Patent and Trademark Office, which is a continuation-in-part application of U.S. patent application Ser. No. 16/178,298, filed on Nov. 1, 2018, in the U.S. Patent and Trademark Office, which is a continuation of U.S. patent application Ser. No. 16/047,948, filed on Jul. 27, 2018, in the U.S. Patent and Trademark Office, the disclosures of which are herein incorporated by reference in their entireties.

BACKGROUND

1. Field

The present disclosure relates to tobacco and cannabis products.

2. Description of the Related Art

Tobacco product manufacturers possess the methods and knowhow to produce products with a wide range of nicotine content and alkaloid profiles. For example, they can produce cigarettes ranging from approximately 0.20 mg per cigarette of nicotine to at least 30 mg per cigarette. Very low nicotine cigarettes and low tar-to-nicotine yield-ratio cigarettes are both useful for tobacco harm reduction for different purposes; the former is to quit smoking and tobacco use altogether or transition smokers to smokeless tobacco products, and the latter is to smoke less. The methods and knowhow of tobacco product manufacturers include genetic engineering and plant breeding techniques to decrease or increase nicotine content in tobacco plants. Nicotine can also be extracted from tobacco for production of very low nicotine cigarettes or nicotine can be added for production of low tar-to-nicotine yield-ratio cigarettes. See, for example, U.S. Pat. Nos. 3,612,066, 9,738,622, 9,814,258 and 10,113,174, which describe these methods employed by tobacco product manufacturers to produce factory-made tobacco products. Tobacco end users, on the other hand, do not possess these method or knowhow capabilities; nor have they had devices or the alkaloids in the appropriate formulations to conveniently and economically add alkaloids, cannabinoids, flavors, or other additives to their smoking products, which include cigarettes, cigars and marijuana cigarettes.

Some people smoke or vape tobacco and cannabis simultaneously, including those who do not otherwise smoke tobacco, since there are reciprocal and fortifying effects from the combination of the nicotine in tobacco and the cannabinoids in cannabis. Inhaling smoke or vapor is the most efficient and quickest way of experiencing the effects of these compounds, whether tobacco or cannabis is smoked or vaped separately or simultaneously. The main issue with smoking or vaping a blend of tobacco and cannabis is that many non-nicotine and non-cannabinoid compounds must be inhaled along with the nicotine and cannabinoids. This is especially the case when smoking a blend of tobacco and cannabis or smoking cigarettes with any added cannabinoids since in either case, many carcinogenic tobacco compounds must be inhaled concurrently with the nicotine and cannabinoids. Michael Russell, referred to as the father of tobacco harm reduction, famously declared, "People smoke for nicotine but they die from the tar." However, using tobacco in any form, including in smokeless tobacco products, is not without risk since tobacco contains tobacco-specific nitrosamines (TSNAs), which are carcinogenic, and include N-Nitrosonornicotine (NNN), 4-N-Nitrosomethylamino-1-(3-pyridyl)-1-butanone (NNK), N-Nitrosoanatabine (NAT), and N-Nitrosoanabasine (NAB). U.S. Pat. No. 10,369,178 discloses tobacco products with added cannabinoids; however, this disclosure in no way solves the problem of smokers being exposed to many tobacco carcinogens including TSNAs in order to enjoy the pleasurable effects of consuming nicotine and cannabinoids simultaneously. Nor does the disclosure propose any device that facilitates consumers modifying their factory-made cigarettes.

Accordingly, there is a need for products comprising appropriate formulations which enable consumers to (i) conveniently, economically, and precisely customize the nicotine, other alkaloid, and/or flavoring content of their factory-made smoking products and (ii) enjoy the pleasurable combined effects of nicotine, cannabinoids and combinations of other compounds through ready-to-vape and ready-to-smoke precision pods without exposure to other tobacco compounds.

SUMMARY

According to an embodiment of the disclosure, there is provided an onsert to apply onto, around, or within a smoking product for transferring one or more compounds to mainstream smoke of the smoking product, the onsert including a cellulosic wrapper, an adhesive disposed on the cellulosic wrapper for adhering the onsert to the smoking product, and one or more compounds disposed on the cellulosic wrapper, the one or more compounds individually equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene.

For the onsert, the smoking product may be a cigarette, and the one or more compounds may be nicotine.

In the onsert, the nicotine may include a nicotine salt.

For the onsert, the smoking product may be a cigarette, and the one or more compounds may be anatabine.

For the onsert, the smoking product may be a cigarette, and the one or more compounds may be Δ9-tetrahydrocannabinolic acid (THCA).

For the onsert, the smoking product may be a cigarette, and the one or more compounds may be cannabidiolic acid (CBDA).

For the onsert, the smoking product may be a cigarette, and the one or more compounds may be Δ9-tetrahydrocannabinolic acid (THCA) and cannabidiolic acid (CBDA) collectively equaling at least 5 mg.

For the onsert, the smoking product may be tobacco, and the one or more compounds may be nicotine.

For the onsert, the smoking product may be tobacco, and the one or more compounds may be anatabine.

For the onsert, the smoking product may be tobacco, and the one or more compounds may be Δ9-tetrahydrocannabinolic acid (THCA).

For the onsert, the smoking product may be tobacco, and the one or more compounds may be cannabidiolic acid (CBDA).

For the onsert, the smoking product may be cannabis, and the one or more compounds may be nicotine.

For the onsert, the smoking product may be cannabis, and the one or more compounds may be anatabine.

For the onsert, the smoking product may be cannabis, and the one or more compounds may be Δ9-tetrahydrocannabinolic acid (THCA).

For the onsert, the smoking product may be cannabis, and the one or more compounds may be CBDA.

For the onsert, the smoking product may be cannabis, and the one or more compounds may be THCA and CBDA collectively equaling at least 5 mg.

For the onsert, the smoking product may be a marijuana cigarette, and the one or more compounds may be nicotine.

For the onsert, the smoking product may be a marijuana cigarette, and the one or more compounds may be anatabine.

In the onsert, the adhesive may be self-sticking.

In the onsert, the adhesive may be moisture activated.

According to an embodiment of the disclosure, there is provided a precision rod for insertion into a smoking product to transfer one or more compounds to mainstream smoke of the smoking product, the precision rod including one or more compounds individually equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, and a cellulosic rod having an ignition temperature of less than 350 degrees Celsius to which the one or more compounds may be adhered to or housed within the cellulosic rod.

For the precision rod, the smoking product may be a cigarette, and the one or more compounds may be nicotine.

In the precision rod, the nicotine may be a nicotine salt.

For the precision rod, the smoking product may be a cigarette, and the one or more compounds may be Δ9-tetrahydrocannabinolic acid (THCA).

For the precision rod, the smoking product may be a cigarette, and the one or more compounds may be cannabidiolic acid (CBDA).

For the precision rod, the smoking product may be a cigarette, and the one or more compounds may be Δ9-tetrahydrocannabinolic acid (THCA) and cannabidiolic acid (CBDA) collectively equaling at least 5 mg.

For the precision rod, the smoking product may be a marijuana cigarette, and the one or more compounds may be nicotine.

For the precision rod, the smoking product may be a cigarette, and the one or more compounds may be anatabine.

According to an embodiment of the disclosure, there is provided a precision rod for insertion into a smoking product to transfer one or more compounds to mainstream smoke of the smoking product, the precision rod including one or more compounds individually equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, an inner chamber that houses the one or more compounds, a flame-resistant rigid material around the inner chamber having an ignition temperature of more than 350 degrees Celsius in which the one or more compounds may be disposed, and at least one vent for ventilation of inbound air into the precision rod and outbound smoke out of the precision rod.

For the precision rod, the smoking product may be a cigarette and, the one or more compounds may be nicotine.

In the precision rod, the nicotine may be a nicotine salt.

For the precision rod, the smoking product may be a cigarette, and the one or more compounds may be Δ9-tetrahydrocannabinolic acid (THCA).

For the precision rod, the smoking product may be a cigarette, and the one or more compounds may be cannabidiolic acid (CBDA).

For the precision rod, the smoking product may be a cigarette, and the one or more compounds may be Δ9-tetrahydrocannabinolic acid (THCA) and cannabidiolic acid (CBDA).

For the precision rod, the smoking product may be a marijuana cigarette, and the one or more compounds may be nicotine.

According to an embodiment of the disclosure, there is provided a ready-to-vape precision pod for use with a vaporizer configured to generate vapor from dry herbs or concentrated plant extracts for the simultaneous inhalation of two or more compounds, the ready-to-vape precision pod including each of two or more blended compounds equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, a compartment that houses the two or more blended compounds, and one or more vents for ventilation of inbound air into the compartment and outbound vapor out of the compartment, wherein the ready-to-vape precision pod may be configured for placement into an oven chamber of the vaporizer.

In the ready-to-vape precision rod, the two or more blended compounds may be nicotine and Δ9-tetrahydrocannabinolic acid (THCA).

In the ready-to-vape precision rod, the nicotine may be a nicotine salt.

In the ready-to-vape precision rod, the two or more blended compounds may be nicotine, Δ9-tetrahydrocannabinolic acid (THCA), and Cannabidiolic acid (CBDA).

In the ready-to-vape precision rod, the two or more blended compounds may be nicotine, Δ9-tetrahydrocannabinolic acid (THCA), cannabidiolic acid (CBDA), and cannabichromenenic acid (CBCA).

In the ready-to-vape precision rod, the two or more blended compounds may be nicotine and anatabine.

In the ready-to-vape precision rod, the two or more blended compounds may be anatabine and Δ9-tetrahydrocannabinolic acid (THCA).

In the ready-to-vape precision rod, the two or more blended compounds may be anatabine and cannabidiolic acid (CBDA).

In the ready-to-vape precision rod, the two or more blended compounds may be anatabine, Δ9-tetrahydrocannabinolic acid (THCA), and cannabidiolic acid (CBDA).

According to an embodiment of the disclosure, there is provided a ready-to-vape precision pod for use with a vaporizer, the ready-to-vape precision pod including one or more compounds equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, marijuana equaling at least 5 mg, a compartment that houses the one or more compounds and the marijuana, and one or more vents for ventilation of inbound air into the compartment and outbound vapor out of the compartment, wherein the ready-to-vape precision pod may be configured for placement into an oven chamber of the vaporizer.

In the ready-to-vape precision rod, the one or more compounds may be nicotine.

In the ready-to-vape precision rod, the one or more compounds may be Tetrahydrocanabivarinic acid (THCVA).

In the ready-to-vape precision rod, the one or more compounds may be Δ9-tetrahydrocannabinolic acid (THCA).

According to an embodiment of the disclosure, there is provided a flavor injection system for infusing one or more compounds into a smoking product to transfer the one or more compounds to mainstream smoke of the smoking product, the flavor injection system including a plunger mechanism, a precision rod for insertion into the smoking product, and one or more compounds individually equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), cannabigerovarinic acid (CBGVA), tetrahydrocanabivarinic acid (THCVA), cannabidivarinic acid (CBDVA), cannabichromevarinic acid (CBCVA), myrcene, caryophyllene, pinene, limonene and humulene, wherein the plunger mechanism is connected to the precision rod, wherein the precision rod comprises one or more holes and an inner chamber that houses the one or more compounds, and wherein the plunger is configured to infuse the mainstream smoke of the smoking product with the one or more compounds by pushing the compounds through the one or more holes in the precision rod into the mainstream smoke of the smoking product.

According to an embodiment of the disclosure, there is provided a method of increasing the nicotine smoke yield of a factory-made cigarette, the method including providing an onset including a salt of nicotine, wherein the onset may be for insertion into the factory-made cigarette.

According to an embodiment of the disclosure, there is provided a method of increasing nicotine smoke yield of a factory-made cigarette, the method including providing a precision rod including a salt of nicotine, wherein the precision rod may be for insertion into the factory-made cigarette.

According to an embodiment of the disclosure, there is provided a nicotine-enhanced cigarette including a cigarette and an adjunct source of nicotine connected to or inserted into the cigarette, wherein the adjunct source of nicotine increases the nicotine yield of the cigarette by at least 10 percent.

The adjunct source of nicotine may be an onset connected to the cigarette.

The adjunct source of nicotine may be a precision rod inserted into the cigarette.

According to an embodiment of the disclosure, there is provided a ready-to-smoke precision pod for use with a smoking product for the simultaneous inhalation of two or more compounds, the ready-to-smoke precision pod including each of two or more blended compounds equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, a compartment that houses the two or more blended compounds, and one or more vents for ventilation of inbound air into the compartment and outbound smoke out of the compartment, wherein the smoking product includes a pipe, bowl or bong, and wherein the ready-to-smoke precision pod may be configured for placement into a chamber of the smoking product.

In the ready-to-smoke precision pod, the two or more blended compounds may be nicotine and Δ9-tetrahydrocannabinolic acid (THCA).

In the ready-to-smoke precision pod, the nicotine may be a nicotine salt.

In the ready-to-smoke precision pod, the two or more blended compounds may be nicotine, Δ9-tetrahydrocannabinolic acid (THCA), and cannabidiolic acid (CBDA).

In the ready-to-smoke precision pod, the two or more blended compounds may be nicotine, Δ9-tetrahydrocannabinolic acid (THCA), cannabidiolic acid (CBDA), and Cannabichromenenic acid (CBCA).

In the ready-to-smoke precision pod, the two or more blended compounds may be a nicotine salt and anatabine.

In the ready-to-smoke precision pod, the two or more blended compounds may be anatabine and Δ9-tetrahydrocannabinolic acid (THCA).

In the ready-to-smoke precision pod, the two or more blended compounds may be anatabine and cannabidiolic acid (CBDA).

In the ready-to-smoke precision pod, the two or more blended compounds may be anatabine, Δ9-tetrahydrocannabinolic acid (THCA), and cannabidiolic acid (CBDA).

According to an embodiment of the disclosure, there is provided a ready-to-smoke precision pod for use with a smoking product, the ready-to-smoke precision pod including one or more compounds equaling at least 1 mg selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene, very low nicotine tobacco equaling at least 5 mg, a compartment that houses the one or more compounds and the very low nicotine tobacco, and one or more vents for ventilation of inbound air into the compartment and outbound smoke out of the compartment, wherein the smoking product includes a pipe, bowl, or bong, wherein the very low nicotine tobacco includes less than 3 mg/g nicotine, and wherein the ready-to-smoke precision pod may be configured for placement into a chamber of the smoking product.

In the ready-to-smoke precision pod, the one or more compounds may be anatabine.

In the ready-to-smoke precision pod, the one or more compounds may be cannabidiolic acid (CBDA).

BRIEF DESCRIPTION OF THE DRAWINGS

The above and/or other aspects of the present disclosure will be more apparent by describing certain embodiments of the present disclosure with reference to the accompanying drawings, in which.

DETAILED DESCRIPTION OF THE EMBODIMENTS

Figure 1A:
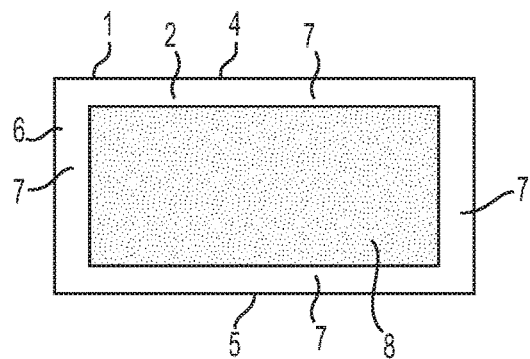
FIG. 1A is a top view of an exemplary embodiment of a self-stick onsert for a cigarette.

Devices and formulations disclosed herein allow tobacco and cannabis end users to conveniently, economically and precisely customize the content of nicotine, cannabinoids, flavoring and/or other additives in the mainstream smoke from their smoking products such as cigarettes and in the mainstream vapor from their vaporizers to meet preferred product and taste preferences regardless of manufacturers' product offerings in a given market. Very low nicotine cigarettes are an important tool for transitioning smokers to e-cigarettes or tobacco heating products and for smokers quitting tobacco and nicotine products altogether; therefore, very low nicotine cigarettes, along with e-cigarettes and tobacco heating products, have great potential for tobacco harm reduction. Since the rate of metabolizing nicotine varies widely across different populations of smokers, consumers having the ability, for example, to slightly increase the nicotine content of their own very low nicotine cigarettes is important. Devices and formulations disclosed herein empower consumers to modify the compounds in the smoke from smoking products and the precisely customize the compounds in vapor from vaporizers to their preferences.

Regarding very low nicotine cigarettes, these modifications allow a greater percentage of smokers to tolerate these cigarettes and exclusively smoke them (without smoking any conventional cigarettes) while attempting to quit tobacco and nicotine products altogether or switch to a less harmful product such as e-cigarettes or ready-to-vape precision pods comprising unique blends of compounds. See U.S. patent application Ser. No. 16/047,948 for methods and various types of very low nicotine cigarettes and other products to assist smokers in transitioning to e-cigarettes or a tobacco heating device or to assist smokers in quitting tobacco and nicotine altogether.

In a phase III clinical trial published in *The Journal of the American Medical Association* to determine if there is a difference in biomarkers of smoke exposure between reducing the nicotine content of cigarettes immediately versus gradually, the immediate reduction in nicotine caused greater withdrawal symptoms, greater use of non-study conventional cigarettes, and higher dropout rates. For these study subjects, the immediate reduction to very low nicotine cigarettes containing tobacco with 0.4 mg nicotine per gram (nicotine content per cigarette is approximately 0.3 mg) was likely too low of a nicotine reduction too quickly. See *JAMA* Sep. 4, 2018, Volume 320, Number 9, pages 880-891. Some of these subjects who dropped out of this study (and other studies using very low nicotine cigarettes) would likely have completed the study if they had access to a device which easily connected to their very low nicotine cigarettes and provided an adjunct source of nicotine transferred to mainstream smoke, as needed by the smoker. Mainstream smoke is the smoke that is inhaled and includes the smoke that emerges from a smoker's mouth or that emerges from the mouth end of a smoking product (e.g., filter end of a filtered cigarette) as a result of a smoker smoking the smoking product. The amount of nicotine provided for this purpose would be quite low.

In a phase II clinical trial to examine the effects of reduced nicotine cigarettes on smoking behavior, toxicant exposure, dependence and abstinence, there were three interventions: six weeks of (i) 0.05 mg nicotine yield cigarettes (very low nicotine content cigarette), (ii) 0.3 mg nicotine yield cigarettes (low nicotine content cigarette with approximately 6-fold the nicotine content of the very low nicotine cigarette), and (iii) a 4 mg nicotine lozenge. Although dropout rates were highest for the nicotine lozenge arm at 48 percent, dropout rates for the 0.05 mg nicotine yield cigarette arm was second highest at 40%, followed by 25 percent for the 0.3 mg nicotine yield cigarette arm. Dropouts were considered treatment failures so reducing the dropout rate among those using the very low nicotine cigarette would have been beneficial since the very low nicotine cigarette arm had the highest abstinence rate post treatment among the 3 interventions. See Hatsukami et al. 2010, *Addiction*, 105(2):343-55. If those in the very low nicotine cigarette arm of the study had access to a product which easily connected to their very low nicotine cigarettes to slightly increase nicotine in mainstream smoke, as needed, the dropout rate would likely have been less and the cessation rate higher.

For smokers not interested in quitting or switching to a smokeless product, increasing the nicotine content of conventional cigarettes, which results in low tar-to-nicotine yield-ratio cigarettes and decreased smoke inhalation due to the increased concentration of nicotine. Since cigarettes which have a low tar-to-nicotine yield ratio ('tar' machine yield divided by nicotine machine yield which may be an ISO method or other method) of approximately 8 or less are not currently sold by tobacco companies, consumers enhancing the nicotine yield of their factory-made conventional cigarettes is advantageous for those who desire to reduce their harm from smoking but cannot quit smoking cigarettes or will not quit smoking cigarettes. Conventional cigarettes typically have a tar-to-nicotine yield ratio from 10 to 14 (e.g., ISO 'tar' yield of 13 mg and nicotine yield of 1 mg), which means in this example, for every 1 milligram of nicotine, a smoker must inhale about 13 milligrams 'tar.' It is important to note that although people smoke for nicotine, smoking related disease results from the smoke including 'tar.' Reducing the dose of smoke reduces harm.

Due to compensatory smoking behaviors, as compared to conventional cigarettes, exposure to harmful "tar" and gases is decreased with nicotine-enhanced cigarettes (as defined below) while exposure to nicotine remains approximately the same. Although there is variation, smokers generally desire approximately 1 mg of nicotine per cigarette, and any more nicotine per cigarette than what a smoker desires becomes an unpleasant experience. Smokers easily titrate down their smoke exposure when smoking nicotine-enhanced cigarettes by taking smaller puffs and fewer puffs per cigarette. Conventional cigarettes in which the nicotine yield has been enhanced in the mainstream smoke by embodiments herein, allow smokers to obtain this approximate 1 mg of nicotine per cigarette (or any other per cigarette amount a smoker finds acceptable) more efficiently and smokers inhale less smoke, as compared to conventional cigarettes in which the nicotine yield has not been enhanced. See, for example, Armitage et al. 1998, *Psychopharmacology*, 96:447-453; Fagerstrom 1982, *Pharmacology*, 77:164-167; Russell M. A., *Nicotine and Public Health*, Chapter 15, American Public Health Organization, 2000; and Pandolfino 2005, Presentation on Oct. 19, 2005 at Life Science Research Organization (LSRO), *Reducing the Adverse Health Impact of Cigarettes on Smokers Who Will Not or Cannot Abstain Through Modification of Leaf Nicotine Content*, which may be downloaded at the LSRO website.

A conventional cigarette that has a tar-to-nicotine yield ratio of 13, which now includes a sufficient adjunct nicotine source (e.g., a precision rod comprising 18 mg of nicotine inserted into a cigarette), results in a nicotine-enhanced cigarette with a tar-to-nicotine yield ratio of less than eight. The result is that smokers inhale significantly less smoke including less 'tar.' The exact tar-to-nicotine yield ratio depends on the features of the cigarette being enhanced including overall ventilation, type of filter, level of additives, et cetera.

There are various reasons manufacturers do not make certain products available to consumers (e.g., low tar-to-nicotine yield-ratio cigarettes of ≤8) even though there is demand. These include corporate decisions to not cannibalize sales of existing products on the market, lack of technology or intellectual property, high cost or limited availability of raw materials, law or regulations prohibiting manufacturers from selling a product (but not consumers from making or modifying a factory-made product), and/or the level of demand in a market may not justify the large capital expenditures required to bring a product to market (e.g., required machinery).

Each of the terms 'about' or 'approximately' is used herein to mean roughly, around, nearly, or in the region of. When the term 'about' or 'approximately' is used in conjunction with a numerical value or range, it modifies that value or range by reasonably extending the boundaries above and below the numerical values set forth.

"Alkaloids" are a group of nitrogenous compounds typically of plant origin. For example, nicotine is the primary alkaloid found in commercialized cigarette tobacco accounting for, depending on tobacco type (e.g., flue cured, burley and oriental) and variety (e.g., K326), about 95 percent of the total alkaloids in tobacco leaf. Anatabine, nornicotine, anabasine and other alkaloids account for the remaining portion of total alkaloids. The alkaloid profile, which is the percentage or contribution of each alkaloid to the total content of all alkaloids, differs across tobacco types, tobacco varieties and cigarette brand fillers. Depending on tobacco type and variety, anatabine accounts for about 1% to about 4%, nornicotine accounts for about 1% to about 3%, and anabasine accounts for about 0.02% to about 0.4%. As used herein 'nicotine,' 'anatabine' and 'anabasine' may be extracted from any plant species including any species of the genus *Nicotiana*, and any of these alkaloids may also be synthesized, or be an analog, or be made in the form of salts of organic acids. See, e.g., Sisson et al 1990, Beitragezur Tabakforschung International, Volume 14, No. 6, June-July. Synthetic nicotine, nicotine salts derived from synthetic nicotine, synthetic anatabine, anatabine salts derived from synthetic anatabine, synthetic anabasine, anabasine salts derived from synthetic anabasine, analogs of nicotine, analogs of anatabine, analogs of anabasine, nicotine salts of organic acids, anatabine salts of organic acids, and anabasine salts of organic acids are included herein in the meaning of nicotine, anatabine and anabasine, respectively. Nicotine salts, nicotine co-crystals, and nicotine salt co-crystals are all included in the meaning of nicotine herein and any of these including combination may be used in any embodiment herein.

Although nicotine is a hygroscopic oily liquid which may be utilized in the embodiments herein in that form, end users enhancing the delivery of nicotine in finished tobacco products with nicotine as a solid or semi-solid is preferred for the embodiments herein due to increased stability and cleaner and easier applications for end users, as compared to liquid forms of nicotine. See, for example, U.S. Pat. No. 9,738,622, which discloses nicotine salts, nicotine co-crystals and nicotine salt co-crystals that are in a solid or semi-solid form, but does not disclose methods or devices for consumers to incorporate these as an adjunct source of nicotine to finished tobacco products or smoking products such as factory-made cigarettes. Liquid forms of nicotine such as e-liquids or e-juice would inhibit the ignition and burning of smoking products to produce smoke, and the nicotine content is too diluted to be a significant and effective adjunct nicotine source. Besides being too voluminous for the embodiments herein, these liquid and dilute forms of nicotine would defeat the purpose of some of the aerosol embodiments herein for vaporizers since too much aerosol would be required to be generated for a given dose of nicotine. Whether smoke or vapor, the less inhaled the better, which is an advantage of concentrating nicotine and cannabinoids in the embodiments herein.

In addition to solid or semi-solid forms of nicotine, other compounds utilized in the formulations herein for onserts, precision rods, and precision pods are preferably in a solid or semi-solid form. A solid, of course, is a fundamental and commonly referred to state of matter (others are liquid, gas and plasma). A semi-solid is the physical term for something whose state lies between a solid and a liquid. A semi-solid material is similar to a solid in some characteristics such as the ability to support its own weight and to hold its own shape. Examples of semi-solids are peanut butter, toothpaste and petroleum jelly. Blends of compounds and components for formulations in, on or within onserts, precision rods or precision pods may include solids, semi-solids and liquids; however, the final blended formulation is preferably a solid or semi-solid (not a liquid such as an e-liquid). For example, a blend of ingredients in the compartment of a precision pod may include a crystalline nicotine salt, a wax of concentrated cannabis, and liquid glycerin resulting in the final blended formulation being a solid or semi-solid (which depends on proportions of each of the 3 ingredients used) even though a liquid was utilized (to add an appropriate level of moisture).

A nicotine salt is a form of nicotine characterized by the interaction between nicotine in ionic form and a coformer in ionic form such as an acid by the transfer of one or more protons from the coformer donor to the nicotine acceptor. The structure of nicotine has two nitrogen atoms capable of accepting protons from a coformer so it can be present in non-protonated, mono-protonated or di-protonated form. Examples of nicotine salts include but are not limited to the following: nicotine 4-acetamidobenzoate, nicotine ascorbate, nicotine aspartate, nicotine benzoic, nicotine bitartrate, nicotine chloride such as nicotine dihydrochloride and nicotine hydrochloride, nicotine citrate, nicotine 2,3-dihydroxybenzoate, nicotine 3,5-dihydroxybenzoate, nicotine fumarate, nicotine gentisate (2,5-hydroxybenzoic), nicotine glutamate, nicotine 1-hydroxy-2-naphthoate, nicotine 3-hydroxybenzoate, nicotine lactate, nicotine levulinic, nicotine malate, nicotine mono-pyruvate, nicotine mucate, nicotine perchlorate, nicotine pyruvate, nicotine salicylate, nicotine succinate, nicotine sulfate, nicotine tartrate and nicotine zinc chloride.

A nicotine co-crystal is a form of nicotine encompassing nicotine and at least one other component (coformer) in which both are in neutral form. Co-crystals are usually characterized by a crystalline structure, which is generally held together by freely reversible, non-covalent interactions. Co-crystals are typically made up of nicotine and at least one other component in a defined stoichiometric ratio and can include hydrates, solvates and clathrates. Co-crystals can comprise nicotine in combination with an organic and/or an inorganic component and are generally distinguished from salts by the absence of a proton transfer between the components (the nicotine and the one or more coformers) in a co-crystal. In contrast, a nicotine salt co-crystal is a type of hybrid structure with both salt and co-crystal features. Typically, a nicotine molecule within a salt co-crystal is associated with at least two coformers (which may be the same or different), in which one coformer is in ionic form such as an acid and transfers a proton to the nicotine molecule and the second coformer does not transfer a proton to the nicotine molecule. Any form of nicotine, including nicotine salts, nicotine co-crystals, and/or nicotine salt co-crystals may be utilized herein for any onsert, precision rod or precision pod embodiment.

As used herein, "cigarette" means any roll of tobacco, which may include non-tobacco materials, wrapped in paper that when lit combusts and produces smoke. A cigarette usually also includes a filter, plug wrap (constrains the filtration materials) and tipping paper (holds the cigarette paper to the filter and plug wrap). Glue seals the cigarette paper together, and if the cigarette has a filter, glue holds these other components together. The term cigarette shall also include any roll of tobacco wrapped in any substance containing tobacco which, because of its appearance, the type of tobacco used, or its packaging and labeling, is likely to be offered to, or purchased by, consumers as a cigarette. An example is a 'little cigar' which may include a filter and generally looks very similar to a cigarette. Factory-made cigarettes mean cigarettes that are fabricated and rolled in a factory by a tobacco manufacturer, and unless provided to smokers as research cigarettes, factory-made cigarettes are typically purchased at retail stores by end users. Factory-made cigarettes usually come in packs of twenty cigarettes.

As used herein, "marijuana cigarette" means any roll of cannabis wrapped in paper or any other non-tobacco material that when lit combusts and produces smoke for inhalation. A marijuana cigarette (i.e., joint) does not contain tobacco; however, may yield nicotine or other tobacco alkaloids if an onsert or precision rod, as disclosed herein, is attached to or is inserted within the marijuana cigarette. A marijuana cigarette may be rolled by cannabis end users or fabricated in a factory by a cannabis manufacturer. Unlike a marijuana cigarette, a blunt is marijuana rolled in a tobacco leaf or cigar wrapper that comprises tobacco, and a spliff is a marijuana cigarette which also contains tobacco.

As opposed to factory-made cigarettes, roll-your-own (RYO) cigarettes or make-your-own (MYO) cigarettes are put together by tobacco end users. RYO cigarettes are made with tobacco and rolling papers. A cigarette roller may also be utilized to roll the tobacco into the rolling paper. MYO cigarettes are generally made with tobacco and a mechanical MYO machine in which the tobacco is inserted into an empty cigarette tube (with or without a filter). A mechanism inserts the tobacco into the tube and the result is a cigarette that looks very similar to typical store-bought factory-rolled cigarettes. Although RYO (tobacco and rolling papers) or MYO (tobacco and tubes) cigarettes are generally each cheaper for consumers to purchase than factory-made cigarettes, RYO and MYO cigarettes are time consuming and tedious to assemble and usually do not have the uniformity or quality of factory-made cigarettes. RYO tobacco and MYO tobacco are essentially the same and closely resemble filler of factory-made cigarettes. RYO tobacco, MYO tobacco and pipe tobacco are all finished tobacco products (as defined below) which tobacco end users purchase to smoke.

As used herein, "filler" means the cumulative smokable material (besides cigarette paper), wrapped in the rod of a cigarette, or in a tobacco stick of a tobacco heating device (or in tobacco heating rod [e.g., TEEPS®] if no separate holder in a tobacco heating product), selected from the group consisting of cut tobacco leaf (cut-rag), tobacco stem, reconstituted tobacco, expanded tobacco, cannabis, casings, flavorings and other additives or ingredients such as cannabinoids or additional alkaloids such as anatabine. Reconstituted tobacco is usually included in the filler of factory-made cigarettes and resembles cut-rag tobacco. Expanded tobacco is also usually included in the filler of factory-made cigarettes and is processed through the expansion of suitable gases so that the tobacco is 'puffed' resulting in reduced density and greater filling capacity of the tobacco rod. Expanded tobacco reduces the weight of tobacco used in cigarettes.

As used herein, "reconstituted tobacco," also known as Recon, means tobacco sheet produced by the rolling or casting of tobacco dust, stems and/or by-products that have previously been finely ground are then mixed with a cohesive agent or binder and typically humectants, flavors and preservatives are included. The result in a paper-like malleable sheet which is essentially recycled tobacco. The two types of reconstituted tobacco known in the art are band cast and paper cast. For each of these, every producer has a slightly different process. The Recon process allows virtually any compound or plant fraction to be added. Once the reconstituted tobacco sheet is fabricated, it is then cut into small strips. The size and shape of the strips are typically similar to the size of cut-rag tobacco, and the reconstituted tobacco may be blended into the filler of cigarettes; however, the large sheets of Recon can be cut to any size. See, e.g., U.S. Pat. Nos. 4,270,552 and 5,724,998 and Chapter 11, 377-379, Tobacco: Production, Chemistry and Technology, 1999. Nicotine, anatabine, anabasine, THCA, CBDA, CBCA, CBGA, THCVA, CBDVA, CBCVA, CBGVA, myrcene, caryophyllene, pinene, limonene and/or humulene may be further incorporated during the Recon production process before the sheets are fabricated. In some exemplary embodiments herein, the reconstituted tobacco sheet is utilized for production of wrappers for onserts and the Recon sheets are cut accordingly, or the reconstituted tobacco sheet may be very finely cut, ground and incorporated into precision pods or precision rods. In other exemplary embodiments, very low nicotine tobacco is reconstituted and utilized for onserts, precision rods or precision pods.

As used herein, "reconstituted cannabis" means a cannabis sheet produced in the same fashion as reconstituted tobacco sheet in which cannabis flowers, leaves, dust, stems and/or by-products that have been previously finely ground are then rolled or casted and mixed with a cohesive agent or binder which usually includes humectants, flavors and preservatives. Reconstituted cannabis sheet does not require any tobacco portions so it can be made tobacco free, and if no nicotine is desired, it can be made nicotine free, and is easily made into reconstituted sheets similar to reconstituted tobacco. The cannabis portion of the reconstituted cannabis sheet may be made from approximately 70 percent to approximately 90 percent cannabis plant parts. Once fabricated, reconstituted cannabis sheet is cut to any size desired. In some exemplary embodiments, the reconstituted cannabis is utilized for production of wrappers for onserts or cut very fine and incorporated into precision pods or precision rods. Nicotine, anatabine, anabasine, THCA, CBDA, CBCA, CBGA, THCVA, CBDVA, CBCVA, CBGVA, myrcene, caryophyllene, pinene, limonene and/or humulene may be further incorporated during the Recon production process before the reconstituted cannabis sheets are fabricated. Very low THC cannabis or THC-free cannabis may be produced from hemp strains or varieties, or strains or varieties of cannabis that are genetically engineered for very low THC content and utilized for reconstituted cannabis. Very low THC cannabis and low nicotine (or zero nicotine) tobacco may both be utilized in the same reconstituted sheet.

In other exemplary embodiments, reconstituted plant material (e.g., leaves and stems) is utilized for production of wrappers for onserts or for use in precision pods or precision rods, and the reconstituted sheet does not include any tobacco or cannabis. Herbs such as jasmine and ginseng, for example, are utilized for production of "reconstituted herbal sheet." Whether reconstituted tobacco, reconstituted cannabis and/or reconstituted jasmine, for example, nicotine, anatabine, anabasine, THCA, CBDA, CBCA, CBGA, THCVA, CBDVA, CBCVA, CBGVA, myrcene, caryophyllene, pinene, limonene and/or humulene are incorporated (infused) during the Recon production process before the reconstituted sheets are fabricated.

As used herein, "finished tobacco product" means a tobacco product that is ready for consumer use or consumption and includes but is not limited to cigarettes, cigars, little cigars, cigarillos, roll-your-own (RYO) tobacco (used with rolling papers by end users to roll their own cigarettes or marijuana cigarettes), make-your-own (MYO) tobacco (used with cigarette tubes and a mechanical MYO machine, typically by end users to make their own cigarettes or marijuana cigarettes, in which the tobacco or cannabis is inserted by the machine into an empty cigarette tube), cannabis, pipe tobacco, tobacco heating products (e.g., IQOS®), snuff, snus, and chewing tobacco such as dipping tobacco. E-cigarettes are not tobacco products since the only fraction of tobacco they contain is nicotine. RYO tobacco or MYO tobacco may not be designated as either on packaging and may be referred to as "tobacco" since it can be used as RYO tobacco or MYO tobacco.

As used herein, "smoking product" means any product that is ready for consumer use or consumption that when used by itself (e.g., cigarette) or used with an interdependent smoking product (e.g., a pipe and pipe tobacco are interdependent on one another) produces mainstream smoke for inhalation (except smoke from certain cigars may not be inhaled by some cigar smokers, due to the high nicotine content and high pH of the smoke resulting in nicotine being absorbed through the mouth) when ignited, and includes but is not limited to cigarettes, cigars, roll-your-own (RYO) tobacco, cannabis, rolling papers for RYO tobacco or cannabis, make-your-own (MYO) tobacco, cigarette tubes for MYO tobacco or cannabis, pipes, bowls, bongs, tobacco, reconstituted tobacco, spliffs, blunts, and marijuana cigarettes. RYO tobacco and MYO tobacco, individually or collectively, may be referred to herein as 'tobacco' or 'finished tobacco.' A bowl is a type of pipe that typically has a shorter stem. The 'tobacco chamber,' 'cannabis chamber' or 'chamber' is where tobacco or cannabis is burned in pipes, bowls and bongs. Onserts, precision rods and certain precision pods (those not for vaporizers) are also smoking products.

As used herein, "conventional cigarette" means a cigarette having a conventional nicotine content of at least 9 mg per cigarette. The average nicotine content of conventional commercial cigarette brands is approximately 14 mg of nicotine per cigarette but may range from approximately 9 mg to over 20 mg of nicotine per cigarette. See Morton et al. 2008, *Regul Toxicol Pharmacol*. doi: 10.1016/j.yrtph.2008.03.001.

As used herein, "very low nicotine cigarette" means a cigarette containing 2.0 milligrams (mg) nicotine per cigarette or less such as less than 0.05 mg, 0.10 mg, 0.15 mg, 0.20 mg, 0.25 mg, 0.30 mg, 0.35 mg, 0.40 mg, 0.45 mg, 0.50 mg, 0.55 mg, 0.60 mg, 0.65 mg, 0.70 mg, 0.75 mg, 0.80 mg, 0.85 mg, 0.90 mg, 0.95 mg, 1.00 mg, 1.05 mg, 1.10 mg, 1.15 mg, 1.20 mg, 1.25 mg, 1.30 mg, 1.35 mg, 1.40 mg, 1.45 mg, 1.50 mg, 1.55 mg, 1.60 mg, 1.65 mg, 1.70 mg, 1.75 mg, 1.80 mg 1.85 mg, 1.90 mg or 1.95 mg nicotine per cigarette. Per cigarette nicotine content is calculated by multiplying the weight of the filler in a cigarette rod by the nicotine content of the filler in the cigarette rod. For example, if the filler of a cigarette weighs 0.666 gram and has a nicotine content of 3 mg/g, the nicotine content of the cigarette is about 2 mg. Filler having a nicotine content of 3 mg/g equates to an approximate 85% reduction of the average nicotine content of tobacco filler in conventional cigarette brands which is approximately 20 mg/g.

Very low nicotine cigarettes have been manufactured by the tobacco industry at various times for decades. For example, John Alden Tobacco Company manufactured the John Alden very low nicotine cigarette brand in the 1950s and advertised the brand as "At least 85% less nicotine than the two leading filter tip brands." The low-nicotine tobacco used in John Alden very low nicotine cigarettes was classified by the U.S. Department of Agriculture as Type 31-V. In addition to growing tobacco that already has very low nicotine, other processes have been developed. For example, Philip Morris USA developed a commercial supercritical CO2 process to remove 97% of nicotine from filler and sold various brands of very low nicotine cigarettes.

As used herein, a "nicotine-enhanced cigarette" means a cigarette which includes an adjunct source of nicotine (e.g., from an onsert or precision pod) resulting in the nicotine smoke yield of the cigarette being increased by equal to or greater than 7 percent, as measured by an industry-accepted, standardized, smoking-machine test method (e.g., International Standards Organization [ISO] smoking-machine test method 4387:2000 [Cigarettes—Determination of total and nicotine free dry particulate matter using a routine analytical smoking machine]), as compared to the nicotine smoke yield of the cigarette without the adjunct source of nicotine as measured by the same said test method. The nicotine yield of very low nicotine cigarettes or conventional cigarettes may be enhanced by an adjunct source of nicotine. Other examples of industry-accepted, standardized, smoking-machine test methods are the Canadian intense method, the Massachusetts method, and the Federal Trade Commission (FTC) method. Besides an adjunct source of nicotine, nicotine-enhanced cigarettes, may also utilize a device used in conjunction with the adjunct source of nicotine such as a cigarette holder.

Depending on the design of the cigarettes being infused with an adjunct nicotine source, including the level of ventilation of the cigarette, the increase in nicotine smoke yield will vary from cigarette type to cigarette type for a given amount of adjunct nicotine (e.g., a precision rod comprising of 10 mg nicotine). Just as a small percentage of the nicotine in the filler of a cigarette (the average nicotine content of a cigarette is about 14 mg) transfers to mainstream smoke (may be measured by a smoking machine), which ranges from approximately one percent of the nicotine content for highly ventilated cigarettes to approximately ten percent of the nicotine content for virtually non-ventilated cigarettes, a similarly small percentage of nicotine is transferred from an onsert or precision rod to mainstream smoke. This nicotine transfer rate, which is the rate that the nicotine content in the filler of a cigarette (and/or the nicotine content of the nicotine onsert) transfers to the mainstream smoke as measured by a smoking machine, also depends on if any (or the level of) burn accelerators or ash conditioners are included in the cigarette paper and/or source of adjunct nicotine (e.g., onsert). The way smoking products including cigarettes are smoked (i.e., intensely, by taking large and frequent puffs, or not) also affects the nicotine transfer rate of cigarettes with or without adjunct nicotine sources. Specific smoking regimes such as the ISO, Canadian intense method, or Massachusetts method each standardizes nicotine yields with or without onserts or precision rods.

The increased nicotine yield of the smoke of a nicotine-enhanced cigarette may be equal to, for example, at least 0.002 mg, 0.003 mg, 0.004 mg, 0.005 mg, 0.006 mg, 0.007 mg, 0.008 mg, 0.009 mg, 0.010 mg, 0.011 mg, 0.012 mg, 0.013 mg, 0.014 mg, 0.015 mg, 0.016 mg, 0.017 mg, 0.018 mg, 0.019 mg, 0.020 mg, 0.025 mg, 0.030 mg, 0.035 mg, 0.040 mg, 0.045 mg, 0.050 mg, 0.055 mg, 0.060 mg, 0.065 mg, 0.070 mg, 0.075 mg, 0.080 mg, 0.085 mg, 0.090 mg, 0.095 mg, 0.100 mg, 0.125 mg, 0.150 mg, 0.175 mg, 0.200 mg, 0.225 mg, 0.250 mg, 0.275 mg, 0.300 mg, 0.325 mg, 0.350 mg, 0.375 mg, 0.400 mg, 0.425 mg, 0.450 mg, 0.475 mg, 0.500 mg, 0.525 mg, 0.550 mg, 0.575 mg, 0.600 mg, 0.625 mg, 0.650 mg, 0.675 mg, 0.700 mg, 0.725 mg, 0.750 mg, 0.775 mg, 0.800 mg, 0.825 mg, 0.850 mg, 0.875 mg, 0.900 mg, 0.925 mg, 0.950 mg, 0.975 mg or 1.000 mg nicotine, et cetera. For example, a nicotine-enhanced cigarette may be a very low nicotine cigarette in which the nicotine yield increased from 0.03 mg to 0.05 mg.

As used herein, an "anatabine-enhanced cigarette" means a cigarette which includes an adjunct source of anatabine resulting in the cigarette having an increased anatabine yield of equal to or greater than 7 percent, as measured by a testing method capable of quantitating anatabine in smoke, and as compared to the same type of factory-made cigarette without said adjunct source of anatabine and measured by the same test method. For an example of such a testing method, see Zhang et al. 2018, *Rapid Commun Mass Spectrom.*, 32:1791-1798 (DOI: 10.1002/rcm.8222). The anatabine yield of very low nicotine cigarettes or conventional cigarettes may be enhanced by an adjunct source of anatabine such as from an onsert or precision rod.

This anatabine source may be plants including tobacco plants with high anatabine in which the anatabine is extracted by, for example, a supercritical $CO_2$ extraction process. The anatabine content may also be enhanced by anatabine salts of organic acids, anatabine analogs or synthesized anatabine. The increased anatabine yield of the smoke of an anatabine-enhanced cigarette may be equal to, for example, at least: 0.10 µg, 0.15 µg, 0.20 µg, 0.25 µg, 0.30 µg, 0.35 g, 0.40 µg, 0.45 µg, 0.50 µg, 0.55 µg, 0.60 µg, 0.65 µg, 0.70 µg, 0.75 µg, 0.80 µg, 0.85 µg, 0.90 g, 0.95 µg, 1.00 µg, 1.10 µg, 1.20 µg, 1.30 µg, 1.40 µg, 1.50 µg, 1.60 µg, 1.70 µg, 1.80 µg, 1.90 g, 2.0 µg, 2.25 µg, 2.50 µg, 2.75 µg, 3.0 µg, 3.25 µg, 3.50 µg, 3.75 µg, 4.0 µg, 4.25 µg, 4.50 µg, 4.75 µg, 5.0 µg, 5.25 µg, 5.50 µg, 5.75 µg, 6.0 µg, 6.25 µg, 6.50 µg, 6.75 µg, 7.0 µg, 7.25 µg, 7.50 g, 7.75 µg, 8.0 µg, 8.25 µg, 8.50 µg, 8.75 µg, 9.0 µg, 9.25 µg, 9.50 µg, 9.75 µg, 10 µg, 11 µg, 12 g, 13 µg, 14 µg, 15 µg, 16 µg, 17 µg, 18 µg, 19 µg, 20 µg, 21 µg, 22 µg, 23 µg, 24 µg, 25 µg, 30 g, 35 µg, 40 µg, 45 µg or 50 µg of anatabine per cigarette. An advantage of an anatabine-enhanced very low nicotine cigarette is that this type of cigarette reduces withdrawal and craving of conventional cigarettes more effectively than very low nicotine cigarettes without enhanced anatabine. Anatabine-enhanced very low nicotine cigarettes are especially useful when used to assist smokers in transitioning to e-cigarettes or a tobacco heating device or to assist smokers in quitting tobacco and nicotine use altogether.

As used herein, an "anabasine-enhanced cigarette" means a cigarette which includes an adjunct source of anabasine resulting in the cigarette having an increased anabasine smoke yield of equal to or greater than 7 percent, as measured by a testing method capable of quantitating anabasine in smoke, and as compared to the same type of factory-made cigarette without said adjunct source of anabasine and measured by the same test method. For an example of such a testing method, see Zhang et al. 2018, *Rapid Commun Mass Spectrom.*, 32:1791-1798 (DOI: 10.1002/rcm.8222). The anabasine yield of very low nicotine cigarettes or conventional cigarettes may be enhanced by an adjunct source of anabasine such as from an onsert or precision rod.

This anabasine source may be plants including tobacco plants or plants in which the predominant alkaloid is anabasine such as *Nicotiana glauca, Nicotiana noctiflora, Nicotiana petunioides* and/or *Nicotiana debneyi* plants. The anabasine may be extracted by, for example, a supercritical CO2 extraction process from any type of tobacco. The anabasine content may also be enhanced by anabasine salts of organic acids, anabasine analogs or synthesized anabasine. The increased anabasine yield of an anabasine-enhanced cigarette may be equal to, for example, at least: 0.01 µg, 0.02 µg, 0.03 µg, 0.04 µg, 0.05 µg, 0.06 µg, 0.07 µg, 0.08 µg, 0.09 µg, 0.10 µg, 0.15 µg, 0.20 µg, 0.25 µg, 0.30 µg, 0.35 µg, 0.40 µg, 0.45 µg, 0.50 µg, 0.55 µg, 0.60 µg, 0.65 µg, 0.70 µg, 0.75 µg, 0.80 µg, 0.85 µg, 0.90 µg, 0.95 µg, 1.00 µg, 1.10 µg, 1.20 µg, 1.30 µg, 1.40 µg, 1.50 µg, 1.60 µg, 1.70 µg, 1.80 µg, 1.90 µg, 2.0 µg, 2.25 µg, 2.50 µg, 2.75 µg, 3.0 µg, 3.25 µg, 3.50 µg, 3.75 µg, 4.0 µg, 4.25 µg, 4.50 µg, 4.75 µg, 5.0 µg, 5.25 µg, 5.50 µg, 5.75 µg, 6.0 µg, 6.25 µg, 6.50 µg, 6.75 µg, 7.0 µg, 7.25 µg, 7.50 µg, 7.75 µg, 8.0 µg, 8.25 µg, 8.50 µg, 8.75 µg, 9.0 µg, 9.25 µg, 9.50 µg, 9.75 µg, 10 µg, 11 µg, 12 µg, 13 µg, 14 µg, 15 µg, 16 µg, 17 µg, 18 µg, 19 µg, 20 µg, 21 µg, 23 µg, 24 µg, 25 µg, 26 µg, 27 µg, 28 µg, 29 µg or 30 µg of anabasine per cigarette. An advantage of an anabasine-enhanced very low nicotine cigarette is that this type of cigarette reduces withdrawal and craving of conventional cigarettes more effectively than very low nicotine cigarettes without enhanced anabasine. Anabasine-enhanced very low nicotine cigarettes are especially useful when used to assist smokers in transitioning to e-cigarettes or a tobacco heating device or to assist smokers in quitting tobacco and nicotine use altogether.

Total alkaloid levels or individual alkaloid levels such as the level of nicotine, anatabine or anabasine in tobacco or filler can be measured by several methods known in the art. Examples include quantification based on gas chromatography (GC) and high-performance liquid chromatography. See, e.g., Lisko et al. 2013, *Anal Chem*. March 19; 85(6): 3380-3384, which provides the following methods used to measure quantities of alkaloids in the filler of cigarette brands and in tobacco types (e.g., burley tobacco). The analysis of minor alkaloids such as anatabine or anabasine has been performed with gas chromatography (GC) coupled with a wide spectrum of detection techniques including flame ionization detection (FID), nitrogen-phosphorus detection (NPD), and mass spectrometry (MS). Other analysis approaches have included high-performance liquid chromatography-ultraviolet detection (HPLC-UV), capillary zone electrophoresis-ultraviolet detection (CZE-UV), micellar electrokinetic capillary chromatography-ultraviolet detection (MECC-UV), nitrogen chemiluminescence detection (NCD), and microemulsion electrokinetic chromatography-ultraviolet detection (MEEKC-UV). Utilization of gas chromatography-tandem mass spectrometry (GC-MS/MS) in multiple reaction mode (MRM) allows for greater compound specificity by eliminating matrix ions arising from other compounds that share the same parent mass but lack the correct transition ion, drastically decreasing background interferences and reducing detection limits. The amount of nicotine (and propylene glycol and glycerol) in e-liquids or blends in precision rods or precision pods may be determined by ISO/DIS 20714, which is a gas chromatographic method, or any other method known in the art. Unless specified or insinuated otherwise, analyte measurements (e.g., nicotine) are on a dry weight basis.

For any exemplary embodiment herein, nicotine is first provided by any of the various methods known in the art for extracting nicotine, anatabine and anabasine from *Nicotiana* plants such as high nicotine *N. rustica* plants and then purifying the extract. These methods are utilized for nicotine replacement therapy products like the nicotine lozenge and nicotine patch. Alternatively, in other embodiments, synthetic nicotine, synthetic anatabine or synthetic anabasine is first provided, which offers advantages of not being extracted from tobacco. See, for example, U.S. Pat. No. 9,556,142 and Ayers et al. 2005 *The AAPS Journal;* 7(3) Article 75, E752-E758 (http://www.aapsj.org). The nicotine is then prepared preferably in a solid or semi-solid form by any of the methods known in the art. These may be in crystalline and/or amorphous form.

Upon crystallization or solidification, the nicotine salt may be cut or ground to form any shape or size depending on the application. For nicotine powder applications, the size may be as small as 25 microns, and for other application the size may be 5 mm. Alternatively, nicotine salts are available commercially. For example, nicotine bitartrate dehydrate, a pure, water-soluble crystalline salt of nicotine in a powder form and used for the production of nicotine lozenges and gums is available from Alchem International SA.

Electronic Nicotine Delivery Systems (ENDS)

Many types of ENDS have been developed and marketed over the past decade. For example, a tobacco heating product is comprised of a holder, tobacco sticks and a charger. The IQOS® tobacco stick (HeatStick®), for example, is inserted into the IQOS® holder which heats the tobacco material by means of an electronically-controlled heating blade. The HeatStick® differs from a cigarette in many ways. For example, the tobacco in the HeatSticks® for the IQOS® product does not burn and is made from tobacco powder uniquely processed and specifically designed to function with the holder to produce an aerosol. In another exemplary configuration, a tobacco heating device is ignited like a conventional cigarette. There may not be any holder, charger or battery and the tobacco may be directly heated in a tobacco heating rod. For example, an ignited carbon heat source heats (and does not burn) the tobacco and produces an aerosol similar to tobacco heating devices which comprise of separate tobacco sticks. The types of tobacco heating devices with carbon heat sources, for example, closely resemble a typical cigarette physically, but do not burn. The disposable heating element is contained in each rod producing the aerosol that is inhaled, known herein as a "tobacco heating rod" or "heating rod." An example is TEEPS® which is being developed by Philip Morris International. Other examples include Eclipse® and Revo®, which were previously sold in the United States but are no longer on the market. In another configuration, a tobacco heating device has no holder or charger and includes a battery in every heating rod and each heating rod may be disposable. Accordingly, it is understood that any device that heats tobacco (or tobacco extract or a form of tobacco such as reconstituted tobacco) below combustion (does not burn the tobacco) to produce an aerosol is a tobacco heating device regardless whether there are separate tobacco sticks from the holder or heating element, whether charging a battery is required or a battery is even required, whether something needs to be ignited such as the end of a carbon heat source, and/or whether any electronics are involved. The terms, tobacco heating device, tobacco heating product, heat-not-burn tobacco device, and heat-not-burn tobacco product as used herein are synonymous.

An e-cigarette is a rechargeable electronic device which includes a heating coil, atomizer that transforms the e-liquid (also known as e-juice) to an aerosol, cartridge or the like (sticks or pods) containing the e-liquid, mouthpiece and battery for recharging the device. Although there are many appearances and designs that may encompass varying steps, they generally operate by drawing on the e-cigarette, activating a heating element which aerosolizes the e-liquid, allowing the aerosol to be inhaled. E-liquids typically contain nicotine, water, flavors and humectants. The humectant acts as a carrier solvent which dissolves the nicotine and flavors and aerosolizes at a certain temperature on the atomizer of the e-cigarette. Typically, propylene glycol and/or glycerol are the solvents used in e-liquids. The e-liquid of e-cigarettes which is contained in cartridges, for example, have nicotine contents which vary widely by brand and brand style.

A vaporizer (vape) vaporizes substances, typically plant material such as cannabis, for inhalation without burning the substances. These include both dry herb vaporizers (e.g., for cannabis flowers) and vaporizers configured for plant extracts such as concentrates or waxy extracts. Some vaporizers are configured for both dry herbs and concentrated extracts such as the PAX 3®. Vaporizers configured for dry herbs and/or concentrates are typically open systems allowing the user to place whatever is desired to be heated into the oven chamber and then the oven chamber is closed with a cover or the like. These types of open system vaporizers such as the PAX 2® are differentiated from closed system vaporizers such as Glo® and IQOS® which use tobacco sticks and the tobacco is not accessible; however, open system vaporizers work similarly to Glo® and IQOS® since open systems like the also generate vapor from smokable plant material (e.g., cannabis), which typically have moisture levels from about 10 percent to about 17 percent. The ready-to-vape precision pods disclosed herein are capable of working with dry herb vaporizers and vaporizers for concentrates which is advantageous. Open system vaporizers are also differentiated from e-cigarettes in that e-cigarettes utilize e-liquids and open system vaporizers do not. As compared to the exemplary embodiments herein of the ready-to-vape precision pods comprising concentrated forms of nicotine, e-cigarettes cause the user to inhale a much greater volume of vapor for a satisfying dose of nicotine (e.g., 1 mg) since the nicotine in e-liquids is drastically diluted to concentrations generally not greater than 0.7 ml nicotine by volume, which equals 5% nicotine by weight. Some other vape devices offer e-liquids at higher concentrations, but none are close to the concentration of nicotine in blends of ready-to-vape precision pods, for example, comprising a crystalline cannabinoid and crystalline salt of nicotine.

A vaporizer includes an electronic heater with temperature regulator, oven or vaporization chamber (where the materials to be heated are placed), cover for oven chamber, mouthpiece, sensors and a rechargeable battery. Generally, as compared to burning cannabis from smoking products, significantly more extraction of cannabinoids occurs with vaporizers heating cannabis due to lack of combustion. Typical temperatures of vaporizers in the oven chamber range from about 160° C. to about 230° C. resulting in a vapor for inhalation; however, ranges can be wider (e.g., 100° C. to 265° C.) since higher temperatures are needed for concentrates. Mainstream vapor is vapor that is inhaled and includes the vapor that emerges from the mouth of a person using a vaporizer or that emerges from the mouth end of a vaporizer.

Cannabis and Cannabis Formulations

"Cannabis" as used herein includes *Cannabis sativa*, *Cannabis indica* and *Cannabis ruderalis*. Both marijuana and hemp strains or cultivars are cannabis. Hemp is genetically more similar to the indica type of marijuana than to sativa strains. Cannabinoids are the group of more than 100 natural chemical compounds that mainly accumulate in female flowers (also known as buds) of cannabis plants. They act on cannabinoid receptors in cells that alter neurotransmitter release in the brain. THCA/THC is one of the dozens of cannabinoids present in cannabis plants. Cannabinoids may be produced intrinsically by a genetically engineered tobacco plant, produced synthetically (see, for example, U.S. Pat. No. 9,587,212) or extracted from cannabis plants for use onserts, precision rods and precision pods. When smokers cease smoking conventional cigarettes their levels of anxiety and depression usually increase; therefore, very low nicotine cigarettes in conjunction with an onsert or precision rod comprising a minimal amount of crystalline CBDA is beneficial in assisting smokers to switch to e-cigarettes or a tobacco heating device or to quit tobacco and nicotine use altogether. For these applications, smoke from very low nicotine cigarettes also containing non-THC cannabinoids from an onsert or precision rod is an improvement over smoke from very low nicotine cigarettes without cannabinoids. The greater period of time during a transitional period smokers are able to exclusively smoke very low nicotine cigarettes (while not smoking any conventional cigarettes), as disclosed in U.S. patent application Ser. No. 16/047,948, the greater probability of them switching to e-cigarettes or a tobacco heating product or quitting tobacco and nicotine use altogether.

The psychoactive effects of THC are primarily mediated by the activation of cannabinoid receptors located throughout the body and are part of the endocannabinoid system, which is involved in a variety of physiological processes such as mood and appetite. Utilizing hemp strains (containing significant THCA content) or marijuana strains or varieties is problematic to include in very low nicotine cigarettes to assist smokers in switching to e-cigarettes or a tobacco heating device since the psychoactive effects of THC would interfere with the daily lives of smokers in that their physical and mental control would be diminished. For example, a smoker attempting to switch to e-cigarettes or a tobacco heating device would not be able to smoke very low nicotine cigarettes containing significant levels of THCA during a lunch break while at work without becoming intoxicated and therefore may not be able to function normally upon returning to work and may become a danger to coworkers. Moreover, employees may fail drug tests if their very low nicotine cigarettes include cannabis which contains THCA. Therefore, it is useful and advantageous to include crystalline CBDA (and not cannabis) from an onsert or precision rod in conjunction with very low nicotine cigarettes or conventional cigarettes, or from a precision pod in conjunction with a vaporizer to prevent any of the psychoactive effects of THC while retaining the benefits CBD. Crystalline CBDA which is 99.5 percent pure does not have any of the intoxicating effects of THC whatsoever.

The cannabinoid biosynthetic pathway in *Cannabis sativa* is understood. Cannabigerolic acid (CBGA) is the precursor to the three main cannabinoid lines: tetrahydrocannabinolic acid (THCA), cannabidiolic acid (CBDA), and cannabichromenic acid (CBCA). During decarboxylation, which occurs during drying and curing of the plant material and/or upon the application of heat (e.g., smoking) to the cannabinoid acid, each of the following 8 cannabinoid acids: CBGA (cannabigerolic acid), THCA ($\Delta$9-tetrahydrocannabinolic acid), CBDA (cannabidiolic acid), CBCA (cannabichromenenic acid), CBGVA (cannabigerovarinic acid), THCVA (tetrahydrocanabivarinic acid), CBDVA (cannabidivarinic acid) and CBCVA (cannabichromevarinic acid), converts to and yields the following corresponding 8 cannabinoid compounds: CBG (cannabigerol), THC ($\Delta$9-tetrahydrocannabinol), CBD (cannabidiol), CBC (cannabichromene), CBGV (cannabigerivarin), THCV (tetrahydrocannabivarin), CBDV (cannabidivarin) and CBCV (cannabichromevarin). As cannabis cures and moisture is reduced, the cannabinoid compounds in their acidic form mature and are slowly converted into related compounds (e.g., THCA to THC). Curing cannabis and storing it over time only causes partial decarboxylation to occur, which is the reason cannabis flowers generally test positive, for example, for both THCA and THC (designated herein as THCA/THC). Smoking or vaporizing cannabis will decarboxylate cannabinoids in acidic form (e.g., THCA to THC) due to the high temperatures present, making them instantly available for absorption through inhalation.

The cannabinoid acid content of the exemplary embodiments herein of onserts, precision rods or precision pods such as CBDA includes the corresponding cannabinoid since partial decarboxylation may have occurred to the cannabinoid acid such as CBDA to CBD. For example, during analytical testing of cannabinoid acids and cannabinoids of onserts, precision rods, precision pods, cannabis plants, cannabis strains and cannabis varieties, an item that is quantified as containing 24 mg CBDA and 1 mg CBD is equivalent to the item described herein as 25 mg CBDA. Therefore, it is understood herein that due to the potential partial decarboxylation of cannabinoid acids to cannabinoids, a cannabinoid acid and cannabinoid may at times be used interchangeably and expressed as, in this instance, 25 mg CBDA, 25 mg CBD or 25 mg CBDA/CBD, all of which have the equivalent meaning.

Every strain or variety of cannabis has a unique cannabinoid profile, which is the content of each cannabinoid in a batch or blend of cannabis divided by the total content of all cannabinoids, measured in percent, or the ratio of one or more cannabinoids to one or more other cannabinoids. An example of a cannabinoid profile in a 10-pound batch of a cannabis is that the THCA/THC content is 65 percent of the total content of all cannabinoids and the remaining cannabinoids comprise the remaining 35 percent. The non-THCA/THC cannabinoids may be further characterized. The ratio of THCA to CBDA is also an example of a cannabinoid profile. Multiple samples are taken from a batch or plant and blended for testing purposes and more than one replicate may be done. Regardless of cannabis strains or variety, CBDA/CBD and THCA/THC are typically the two most prevalent cannabinoids in cannabis. There's usually an inverse relationship between THCA and CBDA across cannabis strains and varieties. The higher the THCA/THC content, the lower the CBDA/CBD content, and the higher the CBDA/CBD content, the lower the THCA/THC content. CBDA/CBD is generally the most abundant cannabinoid combination in hemp strains or varieties. THCA/THC is generally the most abundant cannabinoid combination in marijuana strains, which typically can be approximately between 10 and 20 percent of the weight of the cannabis flower. This CBDA-CBD/THCA-THC relationship of hemp and marijuana is due to the fact that for centuries hemp has been bred for seed and biomass and therefore contains more CBDA/CBD, while marijuana has been bred for pleasurable effects and therefore contains more THCA/THC. While THCA is the more accurate label for cannabis flower that has not been decarboxylated, THCA or THC are often used interchangeably and are essentially equivalent if the flower is going to be smoked, vaporized or heated in some way since heat converts the remaining THCA to THC.

As described herein, precise dose formulations of blends of one or more crystalline salts of nicotine and one or more crystalline cannabinoids used with devices disclosed herein (onserts, precision rods and precision pods) present many types of harm reduction products particularly for those smokers who simultaneously use tobacco and marijuana. Tobacco enhances the pleasurable effects of marijuana when both are smoked simultaneously or when tobacco is smoked shortly after marijuana is smoked. This synergistic effect is due in part to the stimulatory properties of nicotine such as increased heart rate. Some smokers combine tobacco and marijuana in blunts or spliffs. A blunt is marijuana rolled in a tobacco leaf or cigar wrapper that comprises tobacco, and a spliff is a joint which also contains tobacco. Blunts and spliffs are combusted and therefore produce 'tar' and harmful gases which contain thousands of chemicals. Inhaling smoke from burning highly pure forms of crystalline CBDA or THCA, for example, in conjunction with burning a crystalline salt of nicotine, and without any cannabis and tobacco plant material, is less harmful than inhaling smoke from blunts or spliffs since the blend of these pure or nearly-pure crystals results in a significant reduction of mainstream smoke for a given level of cannabinoid and nicotine. Moreover, vaping highly pure, blended forms of crystalline THCA and a crystalline nicotine salt in precision pods, for example, without any propylene glycol and glycerin or with very small amounts (as compared to e-cigarettes), is less harmful than smoking a blunt or spliff. Propylene glycol and vegetable glycerin, which are in e-liquids at high percentages, are considered safe and acceptable substances as food additives; however, there is insufficient data for inhaling these compounds long-term. During the summer of 2019, reports began surfacing about irritated and inflamed lungs from vaping e-liquids that included oils containing THC and vitamin E acetate. Separately, a study showed that inhaling nicotine-free e-cigarette aerosol transiently impacted endothelial function in healthy nonsmokers. See Caporale et al. 2019, doi: 10.1148/radiol.2019190562. These highlight the usefulness of the devices disclosed herein which deliver formulations of active ingredients (e.g., nicotine and cannabinoids) that are concentrated while eliminating or minimizing the level of carriers such as propylene glycol and glycerin. Whether smoked or vaped, for a given dose of nicotine or THCA, for example, highly pure forms of THCA and/or salts of nicotine result is less smoke being inhaled, as compared to blunts or spliffs, and less vapor being inhaled, as compared to vaping cannabis flowers (buds).

Any extraction method known in the art may produce a cannabinoid acid in crystalline form or near crystalline form. These extracted cannabinoid acids, as measured by high-performance liquid chromatography, are preferably at least 90 percent pure, more preferably at least 95 percent pure, more preferably at least 98 percent pure, more preferably at least 99 percent pure, and most preferably at least 99.5 percent pure. These extraction methods include those with liquid carbon dioxide (CO2) under supercritical or subcritical conditions, followed by at least one other further extraction, such as an ethanolic precipitation method to remove a substantial proportion of any remaining non-cannabinoid materials such as plant waxes, wax esters and glycerides, terpenes, carotenes, flavonoids and unsaturated fatty acid residues. See, for example, U.S. Pat. Nos. 7,700,368 and 8,846,409.

The combination of one or more cannabinoid acids and/or one or more salts of nicotine may be included in any exemplary embodiment herein of onserts, precision rods, or precision pods. Any cannabinoid acid, including those in crystalline or near crystalline form, may be utilized including one or more cannabinoid acids selected from the following: CBGA (Cannabigerolic acid), THCA (Δ9-tetrahydrocannabinolic acid), CBDA (cannabidiolic acid), CBCA (cannabichromenenic acid), CBGVA (cannabigerovarinic acid), THCVA (tetrahydrocanabivarinic acid), CBDVA (cannabidivarinic acid) and CBCVA (cannabichromevarinic acid). Any salt of nicotine (nicotine salt), whether in crystalline form, near crystalline form, polymorphic crystalline form, and/or amorphous form, may be utilized including one or more selected from the following: nicotine 4-acetamidobenzoate, nicotine ascorbate, nicotine aspartate, nicotine benzoic, nicotine bitartrate, nicotine chloride such as nicotine dihydrochloride and nicotine hydrochloride, nicotine citrate, nicotine 2,3-dihydroxybenzoate, nicotine 3,5-dihydroxybenzoate, nicotine fumarate, nicotine gentisate (2,5-hydroxybenzoic), nicotine glutamate, nicotine 1-hydroxy-2-naphthoate, nicotine 3-hydroxybenzoate, nicotine lactate, nicotine levulinic, nicotine malate, nicotine mono-pyruvate, nicotine mucate, nicotine perchlorate, nicotine pyruvate, nicotine salicylate, nicotine succinate, nicotine sulfate, nicotine tartrate and nicotine zinc chloride.

Flavorings and Additives

The onserts, precision rods and precision pods disclosed herein, in addition to alkaloids and cannabinoids, may also contain any flavoring and/or additives. Smokers being able to customize their very low nicotine cigarettes with additives or characterizing flavorings during the treatment period of methods to facilitate switching smokers to e-cigarettes or a tobacco heating product, as disclosed in U.S. patent application Ser. No. 16/047,948, is crucial for smokers to better tolerate these non-conventional cigarettes. For example, natural menthol crystals from peppermint oil or oils of other mints may be included in any embodiment herein. Crystalline menthol is clear or white in color and becomes a vapor when tobacco smoke goes through the crystals in precision rods or when precision pods are heated in vaporizers causing the menthol essence to permeate mainstream vapor. Menthol crystals, as a solid, blend well with crystalline cannabinoid acids and crystalline salts of nicotine formulations. Any type of flavoring, whether or not in crystalline form, may be included in onserts, precision rods or precision pods and other examples of characterizing flavors include vanilla (e.g., vanillin), cherry, grape, mango, orange, clove, blueberry, peach, cinnamon, coconut, licorice, chocolate, fruit, coffee, strawberry, pineapple, cucumber, lemon, lime, mint and toffee. Commercial cigarettes characterized and labeled 'menthol' contain anywhere from about 2 mg to 20 mg of menthol. Any onsert, precision rod or precision pod may comprise an amount of the foregoing characterizing flavors of at least 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 50 mg, et cetera.

Additives are also important to enhance some of the formulations of the onsert, precision rod and precision pod embodiments herein. For example, formulations of crystalline cannabinoids and salts of nicotine are devoid of flavors and aromas since all of the plant terpenes have been extracted or were never present in the case of compounds being synthesized. Terpenes are the pungent oils which give cannabis its distinctive aroma and taste. Every strain has a distinct terpene profile. These cannabis terpenes may be reintroduced into formulations of onserts, precision rods and precision pods to add character such as taste and aroma to the smoke or vapor. Although more than 100 terpenes have been identified, the most prevalent terpenes in cannabis include myrcene, caryophyllene, pinene, limonene and humulene.

Additives may also be utilized in the exemplary embodiments of onserts, precision rods, or precision pods to ameliorate any harshness of a crystalline nicotine salt, other crystalline alkaloids, crystalline cannabinoids, and/or other crystalline compounds. The pH of the smoke or vapor produced from the formulations of onserts, precision rods and precision pods is analyzed and adjusted accordingly by the addition of ingredients to shift the pH of the smoke or vapor. For example, if the pH of smoke generated from the formulation of a precision pod under development is greater than about 5.5, sugars, mild acids such as citric acid or fatty acids may be added to blends in precision pods, precision rods or onserts. Plant materials or other constituents may also be added to formulations herein which include plant parts, plant fractions, or plants constituents from herbs (e.g., jasmine or ginseng), cannabis, tobacco and/other plants.

Other functional additives such as preservatives or non-tobacco alkaloids such as cytisine, also known as cytisinicline, are useful. Cytisine is a plant-based alkaloid present in many plant genera, such as *Cytisus* and *Laburnum* (e.g., *Cytisus laborinum* or golden rain acacia). Cytisinicline has a high binding affinity to the nicotinic acetylcholine receptor. It has been used as a smoking cessation treatment in pill form in some European countries. In some exemplary embodiments, including at least 2 mg of cytisinicline in an onsert, precision rod or precision pod reduces the urge to smoke conventional cigarettes and assists smokers transitioning to e-cigarettes or a tobacco heating product or to quit tobacco and nicotine use altogether.

In some aspects of the present invention, products and formulations are provided for smokers to enhance the nicotine, anatabine and/or anabasine smoke yield (i.e., levels) of smoking products such as factory-made very low nicotine cigarettes to facilitate smokers, who are not interested in quitting tobacco and nicotine products altogether, to switch from smoking conventional cigarettes to using e-cigarettes or a tobacco heating device. In this methodology, very low nicotine cigarettes may be utilized as a bridge between the smoker's usual cigarette brand and e-cigarettes or between the smoker's usual cigarette brand a tobacco heating product.

In other aspects, products and formulations are provided for smokers to enhance the nicotine smoke yield of their factory-made conventional cigarettes to reduce a smoker's exposure to cigarette smoke including 'tar' and carbon monoxide.

In other aspects, products are provided for smokers to add new characterizing flavor(s) or to enhance flavor(s) in the smoke of smoking products such as cigarettes.

In other aspects, products are provided for smokers to add nicotine, anatabine and/or anabasine to marijuana cigarettes.

In other aspects, products are provided for smokers to include cannabinoids or other additives or constituents to their smoking products.

In other aspects, products and formulations are provided to allow smokers to enjoy the effects of cannabinoids and nicotine without being exposed to non-nicotine tobacco compounds.

Example 1

Onserts for Smoking Products

Figure 1B:
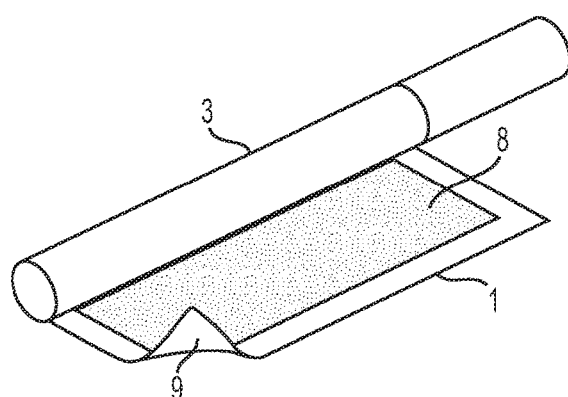
FIG. 1B is a perspective view of the self-stick onsert of FIG. 1A partially wrapped around the cigarette.

To enhance the nicotine smoke yield, nicotine is combined with onserts for the consumer to apply the onserts onto, around, or within smoking products such as cigarettes. The nicotine adhered or infused to the onsert is preferably in the form of a salt of nicotine. The onsert, which comprises of a wrapper made from or including cellulose (e.g., reconstituted cannabis), may be approximately as long as the smoking product such as a cigar and may be any shape or size including wide enough to wrap around a cigarette. As shown in the exemplary embodiment of FIGS. 1A-1C, an onsert 1 comprising a cellulosic wrapper 2 is configured for wrapping around the entire circumference of the cigarette rod 3 of a factory-made cigarette. The width of the cellulosic wrapper 2 of the onsert 1 is larger than the circumference of the cigarette so that both sides 4, 5 of the onsert overlap the cigarette rod to sufficiently seal the cigarette. The self-adhesive (self-stick) side 6 of the onsert 1, which has self-stick adhesive around the entire perimeter (all four sides) 7 of the onsert, is rolled around the cigarette rod 3 while pressing the onsert to the cigarette rod 3. As shown in FIG. 1A and FIG. 1B, the nicotine salt 8 or any other form of nicotine (along with any other compounds or constituents the onsert may comprise) is adhered to the cellulosic wrapper 2 of the onsert, and in this exemplary embodiment, there is no nicotine on the opposite side 9 of the onsert 1. Alternatively, in some exemplary embodiments, the nicotine and any other compounds or constituents are infused within the cellulosic wrapper during the production process by methods known in the art such as those for reconstituting plant materials (e.g., reconstituted tobacco sheet or reconstituted cannabis sheet). In other exemplary embodiments, the nicotine is housed, that is, encased between a closed pocket of opposing sheets (i.e., an encasement or closed pouch) by methods known in the art for producing sugar packets or silica gel packets.

Figure 1C:
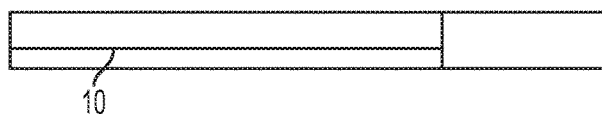
FIG. 1C is a top view of the self-stick onsert of FIGS. 1A and 1B fully wrapped around and stuck to the cigarette.

The entire cigarette rod 3 is now wrapped within the onsert 1, as shown in FIG. 1C. The onsert 1 and the cigarette are adhered to one another and the seal is improved by the smoker pressing along the length of the nicotine-enhanced cigarette at the seam 10. The self-stick onserts may be packaged for distribution in any form such as on non-stick sheets (backing paper), each sheet comprising at least one onsert which is peeled off the non-stick sheet, or the self-stick onserts may be on a continuous roll of multiple onserts in series which are be peeled off the roll one at a time from non-stick backing paper. Although self-stick onserts are preferred, adhesives may be utilized that are activated when moistened (e.g., licked) in order to stick. Any moisture activated adhesive that is known in the art may be utilized on onserts.

Once the cigarette is lit and smoked, a portion of the nicotine from the onsert is transferred to, and becomes part of, the mainstream smoke. The onsert may comprise of any cellulosic material in the form of a wrapper or strip which is burnable and smokable such as any paper or cellulosic material, cigarette paper, reconstituted tobacco sheet including forms used to roll machine made cigars, reconstituted cannabis sheet, formulations of hemp such as hemp paper, and/or cellulosic materials made from other plants such as herbal plants (e.g., ginseng or jasmine). An advantage of the configuration of the onsert in FIGS. 1A-1C is that other ingredients may be easily added to the onsert (between the onsert and cigarette) before the onsert is completely rolled around the cigarette.

In some exemplary embodiments, the onsert is fabricated by covering the onsert with a nicotine salt in conjunction with a binder, stabilizer and/or adhesive known in the art. In this methodology, for example, about 3 parts gum arabic (from the acacia tree and also known as arabic gum or acacia gum) are mixed with about 1 part glycerin and about 1/6 part water in a container for 15 minutes resulting in an adhesive to hold the nicotine salt to the onsert. A thin coat of the binder, stabilizer or adhesive may be applied to uncut sheets after formation (e.g., hemp paper) on the same and/or opposite side of the self-adhesive side for sticking the onsert onto the cigarette. If the nicotine salt is applied to the self-adhesive side, none is applied to where the adhesive is present such as around the perimeter 7 of the onsert, as shown in FIG. 1A. The nicotine salt covering in powder or flake form is then applied at the desired rate to one or both sides of the sheets shortly following the application of the binder, stabilizer or adhesive causing the nicotine salt coating to stick to the sheets. After drying, subsequent coats of the binder, stabilizer or adhesive and nicotine salt may be applied to the sheets. The binder, stabilizer or adhesive may be applied as the final coat thereby better trapping the nicotine on the sheets. The uncut sheets are then cut into multiple onserts at the desired shape and sizes. Onserts configured to wrap around the entire circumference of the smoking product may be any size such as those sizes to completely wrap around, for example, cigars or 100 mm cigarettes. Therefore, the size and type of the smoking product in part dictates the size and configuration of the onsert. The amount of nicotine salt (and/or other compounds) applied to the onsert is also based on the type and characteristics of the smoking product (e.g., ventilation level) and on the level of increase of nicotine yield desired (or the level of increase in yield of any other compounds desired). The increase in nicotine yield (or yield of other compounds) is therefore a function of the type and characteristics of the smoking product and the type and size of the onserts being utilized, including the level compounds included in or on the onsert.

In other exemplary embodiments, a nicotine salt along with other compounds may be infused between two onsert sheets or among more than two onsert sheets, with or without the onsert sheets being covered with nicotine salts on the outside portions of each sheet. In this fabrication arrangement, the gum arabic formulation above (or any other binder, stabilizer or adhesive formulation being utilized) may be used to seal the edges of the two or more sheets or the onserts after the sheets are subsequently cut into multiple onserts for packaging. Self-stick onserts are preferably utilized in this embodiment for the consumer to peel and stick the nicotine onsert onto a cigarette or other smoking product. By not covering and adhering the onsert sheets with nicotine, the nicotine in this fabrication arrangement essentially remains in an encasement between the sheets for a neater consumer application.

The nicotine onserts disclosed herein (and the precision rods and precision pods disclosed and described below) may also include other alkaloids, flavors, cannabinoids, terpenes and/or other additives or constituents. For example, any of the exemplary embodiments herein may be carried out with anatabine or anabasine instead of nicotine or in combination with nicotine, including the exemplary onsert embodiments of FIGS. 1A-1F, whether in nicotine salt formats, nicotine co-crystal formats, or nicotine salt co-crystal formats. Both anatabine and anabasine are alkaloids similar to nicotine and instead of producing salts of nicotine, salts of anatabine or salts of anabasine may be produced for anatabine-enhanced cigarettes and anabasine-enhanced cigarettes. Salts of nicotine may be blended with salts of anatabine and/or salts of anabasine, and salts of anatabine may be blended with salts of anabasine for cigarettes or for marijuana cigarettes with any level or combination of enhanced nicotine, enhanced anatabine or enhanced anabasine. Synthetic versions of these alkaloids may also be utilized.

Each onsert, regardless of which type, may comprise one or more compounds selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene. Each onsert may comprise at least the following amounts of each of the aforementioned compounds: 0.10 mg, 0.20 mg, 0.30 mg, 0.40 mg, 0.50 mg, 0.60 mg, 0.70 mg, 0.80 mg, 0.90 mg, 1.0 mg, 1.1 mg, 1.2 mg, 1.3 mg, 1.4 mg, 1.5 mg, 1.6 mg, 1.7 mg, 1.8 mg, 1.9 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 46 mg, 47 mg, 48 mg, 49 mg, 50 mg, 51 mg, 52 mg, 53 mg, 54 mg, 55 mg, 56 mg, 57 mg, 58 mg, 59 mg, 60 mg, 61 mg, 62 mg, 63 mg, 64 mg, 65 mg, 66 mg, 67 mg, 68 mg, 69 mg, 70 mg, 71 mg, 72 mg, 73 mg, 74 mg, 75 mg, 76 mg, 77 mg, 78 mg, 79 mg, 80 mg, 81 mg, 82 mg, 83 mg, 84 mg, 85 mg, 86 mg, 87 mg, 88 mg, 89 mg, 90 mg, 91 mg, 92 mg, 93 mg, 94 mg, 95 mg, 96 mg, 97 mg, 98 mg, 99 mg, 100 mg, 110 mg, 120 mg, 130 mg, 140 mg, 150 mg, 160 mg, 170 mg, 180 mg, 190 mg, 200 mg, 250 mg, et cetera. For example, an onsert may contain at least 30 mg of nicotine and not any other component listed above or may contain, for example, at least 10 mg nicotine, at least 10 mg THCA and at least 10 mg CBCA. An onsert may contain more than one alkaloid, compound or additive. In some exemplary embodiments, onserts such as the type of onsert shown in FIG. 1A may be utilized specifically to directly roll cannabis and/or tobacco including MYO or RYO finished tobacco blends into the onsert. In other exemplary embodiments, onserts may comprise any of the aforementioned amounts (i.e., at least 0.10 mg through at least 250 mg) of conventional tobacco, low nicotine tobacco, conventional cannabis (i.e., marijuana) and/or very low THC cannabis, with or without any of the aforementioned one or more compounds.

In some exemplary embodiments, the self-stick or moisture-activated adhesive is on the same side of the cellulosic wrapper as the one or more compounds, and in other embodiments, the adhesive is on the opposite side of the cellulosic wrapper as the one or more compounds. In still other embodiments, the one or more compounds are within an encasement and the encasement may be in the middle of the cellulosic wrapper. An onsert may comprise of any compound or combination of compounds, whether the compounds are in an encasement within a cellulosic wrapper or adhered to a cellulosic wrapper, including any of the above amounts (i.e., at least 0.10 mg through at least 250 mg) of nicotine, anatabine or anabasine not extracted from a *Nicotiana* plant; that is synthesized nicotine, anatabine or anabasine, and the onsert may comprise any of the above amounts (i.e., at least 0.10 mg through at least 250 mg) of one or more of the following cannabinoid acids: THCA, CBDA, CBCA, CBGA, CBGVA, THCVA, CBDVA and CBCVA that are synthesized, that is, produced outside a *Cannabis* plant.

Any strain, variety or blend of cannabis may be enhanced by onserts comprising one or more cannabinoids for rolling a marijuana strain, variety or blend of cannabis flowers or other plant parts into the onsert such as the type of onsert shown in FIG. 1A. This is sometimes required since the cannabinoid profile of the dozens of cannabinoids, including the THCA/CBDA ratio and content, of flowers of the same marijuana strain can vary significantly from one harvest to another, especially when grown in different growing conditions. These onserts may be nicotine free and tobacco free and are an ideal way to modify the cannabinoid profile of the smoke from any strain, variety or blend of cannabis flowers without requiring an additional strain, variety or blend of cannabis flowers. For example, an onsert may comprise THCA, CBDA, CBGA, and/or any other cannabinoid for cannabis users to either fortify their marijuana cigarettes, blunts, or spliffs or to change the cannabinoid profile of the smoke from any strain, variety or blend of cannabis in order to achieve desired effects.

In addition to the advantage of any compounds being present on the onsert so that they are included as a new compound not present in the smoking product or provided as an adjunct to a compound already present in the smoking product, the design of the onsert shown in FIG. 1A for directly rolling cannabis and/or tobacco into the onsert has other important advantages over typical RYO cigarettes or RYO marijuana cigarettes. For example, the onsert is more convenient and less messy especially when implemented as a self-stick onsert, the onsert provides a seal on all four sides thereby reducing smoke dilution from unwanted air flow caused by loose rolls. Also, less tobacco or cannabis can be used, especially if the nicotine and/or cannabinoids included with the onserts are pure or semi-pure (e.g., ≥90 pure). In fact, as compared to a cigarette (with or without added cannabinoids), which averages about 650 mg of tobacco (plus the weight of any cannabinoids), an onsert for a smoking product comprising, for example, 20 mg THCA, 10 mg of a nicotine salt, and 200 mg of plant material (whether it is tobacco, cannabis or a blend of the two) rolled into the onsert translates into a smoking product with about 69 percent less plant material. This in turn means that there will be a significant reduction in smoke inhalation including 'tar' inhalation from the onsert, as compared to an average cigarette (with or without added cannabinoids). There will also be a significant reduction in carcinogenic TSNAs since less tobacco is used in conjunction with the onsert.

In some exemplary embodiments, synthetic nicotine may be the only active ingredient included with an onsert (or with a precision rod) so that cannabis users can enjoy the effects of nicotine (not extracted from tobacco) with their cannabis. Whether synthetic nicotine or nicotine extracted from a *Nicotiana* plant is utilized, onserts (or a precision rod comprising nicotine) that provide nicotine to the mainstream smoke from marijuana cigarettes (e.g., cannabis rolled with an onsert such as the onsert in FIGS. 1A-1C) effectively eliminates the need to include any tobacco and the result is a less harmful smoking product, as compared to a spliff, since less plant material needs to be combusted because tobacco is not needed for its nicotine content, thereby reducing smoke inhalation and eliminating tobacco carcinogens such as TSNAs.

It will be appreciated that onserts herein may be any shape or form and any self-stick adhesive (or other adhesives such as those that require moisture to activate) on the onsert may be continuous or in any pattern. For example, the self-stick adhesive is on all four sides 7 surrounding the nicotine salt 8 of the onsert 1 in FIG. 1A. In modified exemplary embodiments, one, two or three sides of the onsert may comprise the self-stick adhesive (or other adhesives such as those that require moisture to activate), or one or more additional strips of adhesive may be added such as through either axis of symmetry of the onsert. Any percentage of either side of an onsert may be comprised of an adhesive. Onserts, including the onserts of FIGS. 1A-1F, may also contain filters, which would be attached to one end of the onsert. Burn accelerators or ash conditioners may be included in or on the onserts. It will also be appreciated that onserts may actually be used as more of an 'insert' in that they may be stuck to the inside of roll-your-own (RYO) rolling papers or placed inside of empty make-your-own (MYO) cigarette tubes (or mixed into the loose tobacco or cannabis for RYO or MYO) before the smoking product is rolled or made by a smoker (i.e., the onsert is hidden after the RYO smoking product is rolled or the after the MYO smoking product is made). When used in this fashion, the transfer rate of one or more alkaloids, flavors, cannabinoids, terpenes, and/or other additives into the mainstream smoke of the smoking product is typically higher, as compared to placing an identical onsert on the outside of the smoking product (e.g., placed on a filled MYO cigarette). Of course, for onserts made specifically to be placed on the inside of RYO or MYO smoking products, the self-stick adhesive feature is optional as is any other adhesive that is activated when moistened (e.g., licked) in order to stick to the smoking product. These exemplary embodiments of onserts which may be inserted into a smoking product may not comprise of any adhesives to stick to smoking products.

Figure 1D:
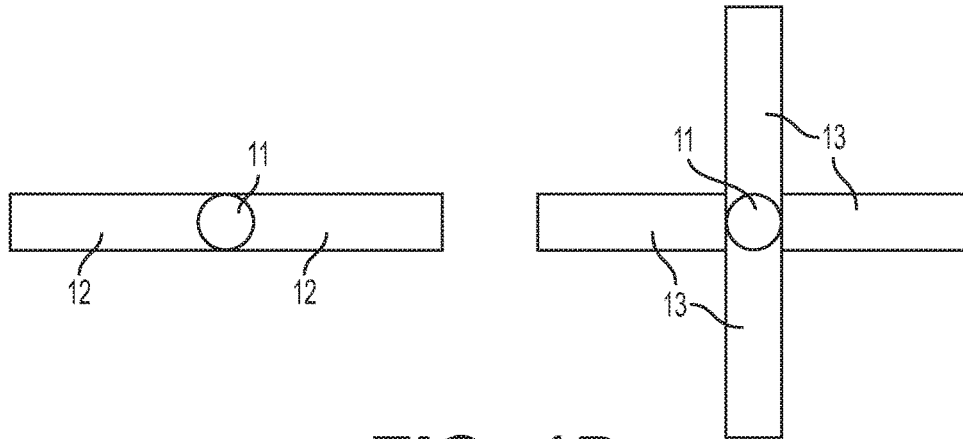
FIG. 1D is a top view of two exemplary embodiments of self-stick onserts.
Figure 1E:
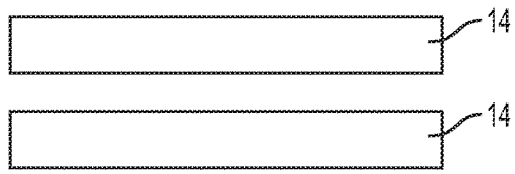
FIG. 1E is a top view of an exemplary embodiment of self-stick onserts.
Figure 1F:
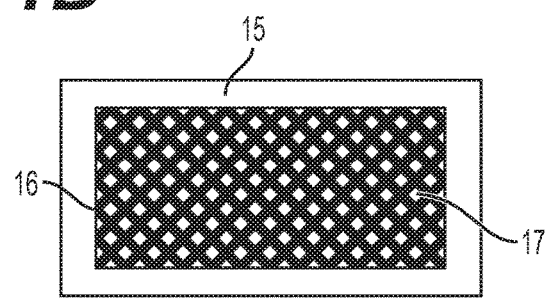
FIG. 1F is a top view of an exemplary embodiment of a self-stick onsert.

FIGS. 1D-1F show exemplary configurations of self-adhesive (self-stick) onserts comprising of cellulosic wrappers which differ in shape from the onsert in FIGS. 1A-1C. As shown in FIG. 1D, the first type of onsert includes a circular window 11 with either two wings 12 or four wings 13 and comprises one or more alkaloids, flavors, cannabinoids, terpenes, and/or other additives. Each of these onserts are positioned around the circular tip of a smoking product such as a cigarette, cigar or marijuana cigarette and the wings, which may be any length, are extended and stuck to the smoking product. Another type are elongated onserts 14 shown in FIG. 1E, which may be positioned, for example, both in parallel along the side of a smoking product such as a cigar or one or both onserts may be wrapped around the smoking product. The alkaloids, flavors, cannabinoids, terpenes, and/or other additives of the onserts in the exemplary embodiments of FIGS. 1D-1E, may be encased between a closed pocket of opposing sheets of the onsert, adhered to either side of the onserts by an adhesive, or infused within the onsert during the production process of the onsert.

Another type of onsert configuration is a web pattern onsert shown in exemplary embodiment of FIG. 1F, which is similar to the onsert of FIGS. 1A-1C as it pertains to function since the onsert may be wrapped around a smoking product such as a cigarette, be used in conjunction with tobacco and/or cannabis to roll (RYO) a cigarette, marijuana cigarette, blunt or spliff, or simply may be rolled and smoked by itself without any interdependent smoking product. On the self-stick adhesive side of the onsert 15, there may be one, two, three or four sides of adhesive around the webbing 16, which comprises the alkaloids, flavors, cannabinoids, terpenes and/or other additives encased in the webbing that is in front of a back sheet 17. These types of non-continuous (i.e., webbed) onserts may be any shape or size and may cover any portion of a smoking product.

In some exemplary embodiments, the onserts may be included inside of a pack of factory-made cigarettes or may be bundled together (e.g., 20) and adhered to the outside of a cigarette pack or rolling paper box as a package onsert. An advantage of packaging the nicotine onserts within or on factory-made cigarette packs is the convenience such packaging presents when an adjunct amount of nicotine may be required by some smokers when using very low nicotine cigarettes to exclusively switch from smoking conventional cigarettes to e-cigarettes or a tobacco heating device, as outlined in U.S. patent application Ser. No. 16/047,948. These nicotine enhanced cigarettes (e.g., nicotine onserts plus very low nicotine cigarettes) assist the smoker to exclusively use the very low nicotine cigarettes during the treatment period, as directed by the protocol, so that the smoker does not cheat and smoke conventional cigarettes during the treatment period. The adjunct amount of nicotine provided by the nicotine onsert(s) may increase the nicotine smoke yield, for example, from 0.04 mg to 0.10 mg per cigarette. Although the nicotine smoke yield more than doubled in this example, the 0.10 mg nicotine yield is still dramatically lower than the typical 1 mg nicotine yield of conventional cigarettes. Nicotine onserts providing an adjunct amount of nicotine to factory-make conventional cigarettes afford great flexibility to smokers customizing their cigarettes in the interest of smoking less of each cigarette. A nicotine-enhanced cigarette in which an onsert comprising nicotine has been attached to a conventional cigarette results in a reduction of the tar-to-nicotine ratio.

Example 2

Precision Rods for Smoking Products

Precision rods comprising an exact amount of one or more flavors, alkaloids, cannabinoids, terpenes and/or other additives, or constituents are fabricated to be inserted into a smoking product to remain in the smoking product during the combustion of the smoking product with the purpose of transferring one or more flavors, alkaloids, cannabinoids, terpenes and/or other additives, or constituents into the mainstream smoke generated by the smoking product. Precision rods provide precisely quantified formulations of compounds of interest as either an adjunct to the intrinsic content of one or more compounds already included in smoking product or as one or more new compounds. There are three types of precision rods. The first type of precision rod is comprised of materials that combust and burn down as the smoking product burns down such as a cigar. Suitable cellulosic materials of these types of precision rods are those which have an ignition temperature of equal to or less than 350 degrees Celsius. Ignition temperature is the least temperature at which a substance starts combustion. These materials must also be sufficiently rigid (or by design can be made to be sufficiently rigid) to be inserted into, for example, the tobacco end of a filtered cigarette and can be burned with the smoking product without presenting unacceptable levels of toxins into the mainstream smoke of the smoking product. Examples of suitable materials for cellulosic precision rods include but are not limited to fiberboard, paper, paperboard or other cellulosic or woody materials, which are preferably produced from hemp or reconstituted hemp, tobacco or reconstituted tobacco, or other plants in which the flavor, alkaloid, cannabinoid, terpene, and/or other additives, or constituents of interest, are adhered to or housed (contained) within a chamber or hollow space in the precision rod. In some exemplary embodiments of precision rods (and precision pods), the compounds and constituents are included in reconstituted hemp, reconstituted tobacco, or other plant material that has been reconstituted, which is then included in the space or inner chamber of precision rods (or in the compartment of precision pods).

Figure 2A:
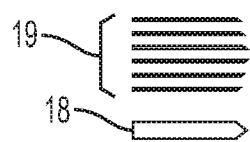
FIG. 2A is a front exploded view of an exemplary embodiment of a precision rod and a view of this precision rod assembled.

As shown in the exemplary embodiment of FIG. 2A, a cellulosic precision rod 18 is comprised of six layers of multi-ply paperboard 19 in which each layer of the multi-ply paperboard is covered, for example, by a nicotine salt (and/or any other compounds), and then all the layers are bound together by a binder or adhesive that is designated, Generally Recognized As Safe (GRAS), by the U.S. Food and Drug Administration (FDA). A cellulosic precision rod may comprise of one or more layers of a cellulosic material. One or more layers of the cellulosic precision rod are bound together during the production process of the layer(s) so that no additional binder or adhesive is necessary. The entire assembled precision rod may be covered with a thin GRAS coating or film so that the compounds are sealed onto the precision rod and they don't get on the user's hands. In other exemplary embodiments, one or two thick layers may be utilized for a cellulosic precision rod, and these types of cellulosic precision rods that utilize thick layers may also comprise at least one chamber or hollow space to house greater amounts of a nicotine salt and/or other compounds.

The second type of precision rod in other exemplary embodiments is comprised of materials that do not combust or burn down as the smoking product burns down and have an ignition temperature of more than 350 degrees Celsius. These precision rods comprise of one or more flavors, alkaloids, cannabinoids, terpenes, and/or other additives, or constituents of interest, and are fabricated to be inserted into either end of the smoking product to remain in the smoking product during the combustion of the smoking product with the purpose of transferring these compounds or constituents to the mainstream smoke generated by the smoking product. Examples of suitable flame-resistant, rigid materials include but are not limited to fused quartz or silica, ceramics such as earthenware or porcelain, or non-toxic ultra-high-temperature ceramics. For embodiments in which only a few puffs will be taken so that the precision rod cannot escape the smoking product and burn the smoker, non-toxic metal or metal alloys such as titanium or food-grade stainless steel may be employed.

Figure 2B:
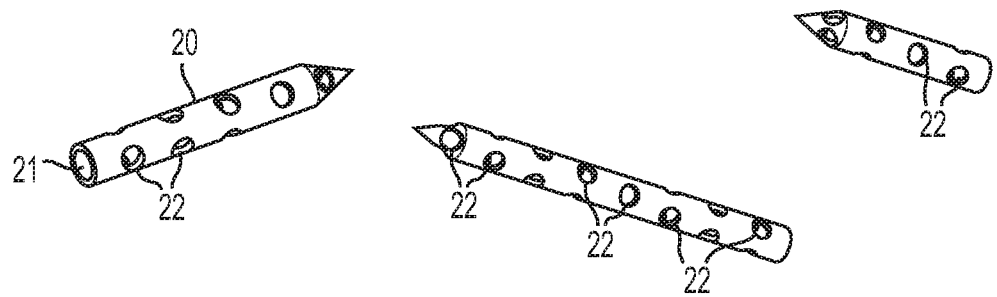
FIG. 2B is a perspective view of exemplary embodiments of precision rods, each with varying size.

As shown in FIG. 2B, there are three exemplary embodiments of cylindrical precision rods of various sizes that do not combust or burn down as the smoking product burns down, including the first precision rod 20. These three precision rods comprise of an inner chamber to house compounds and/or plant materials. The inner chamber 21 begins at the opening at the end of the first precision rod 20, has a diameter of about 1.25 mm and a length of about 13 mm. The first precision rod 20 comprises about 15 mg of a salt of nicotine in powder form (density of about 900 kg/m3) within the inner chamber 21. One end of each precision rod may be pointed for easy insertion into any smoking product such as a factory-made cigarette. A precision rod comprises of one or more holes or vents which also lead to the inner chamber 21. There are various holes 22 across each precision rod in FIG. 2B (only a portion of them are labeled). The number of holes or vents depends on the type of smoking product, the type of compounds or constituents included in the precision rod and their boiling points, the amount of each compound in the precision rod, and the total weight of contents in the precision rod. The holes or vents and the end opening of a precision rod, all of which lead to the inner chamber, facilitate the flow of air, heat and smoke entering and exiting the precision rod. The end opening and holes or vents of a precision rod may be sealed with arabic gum or any GRAS material which easily melts upon being heated. The holes or vents may be kept unsealed, in which case the particle sizes of the compounds are made larger than the holes or vents, and during production the compounds are inserted through the end opening. The end opening may be covered with a peel off tab which the consumer removes before inserting the precision rod into the smoking product. The entire precision rod may be sealed with plastic for the consumer to peel off before use.

Figure 2C:
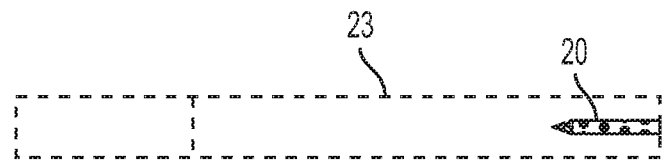
FIG. 2C is a top view of an exemplary embodiment of a precision rod inserted into a cigarette.

As shown in FIG. 2C, the precision rod 20 of FIG. 2B has been inserted into a cigarette 23. Upon the nicotine-enhanced cigarette being smoked, which now includes the precision rod, the holes allow air, heat and smoke to enter the precision rod as nicotine (and/or other compounds in other exemplary embodiments) contained within the rod vaporizes and permeate into the mainstream smoke. Once the nicotine-enhanced cigarette 23 (or other smoking product in other embodiments) is partially smoked down, the cigarette may be snuffed out or the precision rod may be released with the ashes of the cigarette. The smoker will likely be satisfied with only a portion of the nicotine-enhanced cigarette being smoked (e.g., 40%) due to the adjunct nicotine in the precision rod of 15 mg. The smoker may dispose of the partially smoked cigarette or may save the unsmoked portion for later when another precision rod can be inserted into the remaining portion of the cigarette. In either case, the smoker inhales approximately half of the smoke, which includes 'tar,' as compared to smoking the same cigarette without the precision rod. The amount of nicotine inhaled is about the same as if the same cigarette without the precision rod was smoked since the average cigarette contains about 15 mg of nicotine; the same amount in the precision rod. In addition to reducing harm, the smoker also has the option of benefiting economically by purchasing fewer cigarettes if the other half of each cigarette is saved.

The first two types of precision rods may also be inserted into the mouth end of a smoking product which may be the filter of a smoking product such as a filtered cigarette or filtered cigar. For example, a precision rod comprising 8 mg of menthol crystals may be inserted into the mouth end (e.g., filter end) of a cigarette. The holes or vents of precision rods allow the essence of the menthol crystals to enter the mainstream smoke and deliver menthol sensations and satisfaction to the smoker. Since smoking very low nicotine cigarettes do not result in any significant throat impact, as compared to smoking conventional cigarettes, menthol or other flavoring(s) in precision rods increase the acceptability of very low nicotine cigarettes, which facilitate smokers quitting tobacco products altogether and facilitate smokers switching to e-cigarettes or a tobacco heating device (as disclosed in U.S. patent application Ser. No. 16/047,948). E-cigarettes and tobacco heating devices are both generally accepted to be much less harmful than smoking cigarettes. Vaping e-cigarettes, for example, is believed to be approximately 90 percent less harmful than smoking cigarettes.

Figure 2D:
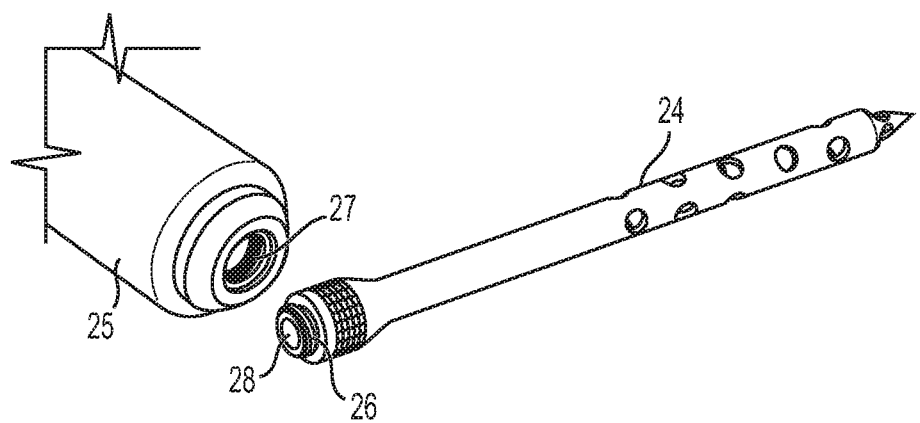
FIG. 2D is a perspective view of an exemplary embodiment of a flavor injection system.

The third type of precision rod is used in conjunction with a flavor injection system. This type of precision rod also comprises one or more flavors, alkaloids, cannabinoids, terpenes and/or other additives, or constituents, and is inserted into a smoking product such as one or more cigarettes or cigars. The compounds in the inner chamber are injected into the smoking product and the precision rod is then removed from the smoking product. As shown in FIG. 2D, the flavor injection system comprises a precision rod 24 and a plunger mechanism 25. The plunger mechanism 25 includes a plunger which is not shown in FIG. 2D. The precision rod 24 includes a fastening mechanism at one end, which in this exemplary embodiment is thread 26 so that the precision rod can be screwed into the thread 27 of the plunger mechanism 25. The precision rod includes an end hole 28, which is the beginning of the inner chamber that houses the compounds or constituents before they are injected into a smoking product. Once the precision rod 24 is inserted into a smoking product and the precision rod and the plunger mechanism 25 are then connected (or the order may be reversed), the plunger, which is connected to the plunger mechanism, is pushed into the plunger mechanism 25 and the contents in the precision rod are emptied into the smoking product. Upon the smoking product being ignited, the mainstream smoke of the smoking product will be infused with the one or more compounds (and any constituents) now included in the smoking product.

In some exemplary embodiments, the flavor injection system and the precision rod are one piece and do not have to be connected. The flavors, alkaloids, cannabinoids, terpenes and/or other additives or constituents may be loaded directly into the plunger mechanism or precision rod by a variety of ways. For example, the plunger may be removed from the plunger mechanism, and the compounds and constituents are emptied or placed into the plunger mechanism which pass through to the precision rod. The plunger is then reattached. The flavor injection system is now ready to infuse a smoking product with the contents in the flavor injection system. Any of the foregoing exemplary embodiments of flavor injection systems may be automated with any type of machine in which one or more smoking products, i.e., one or more cigarettes, for example, are infused with compounds at once or in succession.

Each precision rod, regardless of which of the three types, may comprise one or more compounds selected from the group consisting of nicotine, anatabine, anabasine, flavor, $\Delta$9-tetrahydrocannabinolic acid (THCA), cannabidiolic acid (CBDA), cannabichromenenic acid (CBCA), cannabigerolic acid (CBGA), tetrahydrocanabivarinic acid (THCVA), cannabidivarinic acid (CBDVA), cannabichromevarinic acid (CBCVA), cannabigerovarinic acid (CBGVA), myrcene, caryophyllene, pinene, limonene and humulene. Each of the three types of precision rods may comprise at least the following amounts of one or more of the aforementioned compounds: 0.10 mg, 0.20 mg, 0.30 mg, 0.40 mg, 0.50 mg, 0.60 mg, 0.70 mg, 0.80 mg, 0.90 mg, 1.0 mg, 1.1 mg, 1.2 mg, 1.3 mg, 1.4 mg, 1.5 mg, 1.6 mg, 1.7 mg, 1.8 mg, 1.9 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 46 mg, 47 mg, 48 mg, 49 mg, 50 mg, 51 mg, 52 mg, 53 mg, 54 mg, 55 mg, 56 mg, 57 mg, 58 mg, 59 mg, 60 mg, 61 mg, 62 mg, 63 mg, 64 mg, 65 mg, 66 mg, 67 mg, 68 mg, 69 mg, 70 mg, 71 mg, 72 mg, 73 mg, 74 mg, 75 mg, 76 mg, 77 mg, 78 mg, 79 mg, 80 mg, 81 mg, 82 mg, 83 mg, 84 mg, 85 mg, 86 mg, 87 mg, 88 mg, 89 mg, 90 mg, 91 mg, 92 mg, 93 mg, 94 mg, 95 mg, 96 mg, 97 mg, 98 mg, 99 mg, 100 mg, 110 mg, 120 mg, 130 mg, 140 mg, 150 mg, 160 mg, 170 mg, 180 mg, 190 mg, 200 mg, et cetera. For example, a precision rod may contain at least 30 mg of anatabine and not any other component listed above or may contain at least 10 mg nicotine, at least 10 mg THCA and at least 10 mg CBGVA. A precision rod may contain more than one alkaloid, compound or additive. In some exemplary embodiments, each of the three types of precision rods may further comprise any of the aforementioned amounts, i.e., at least 0.10 mg through at least 200 mg, of conventional tobacco, low nicotine tobacco, conventional cannabis (i.e., marijuana) and/or very low THC cannabis, with or without any of the aforementioned one or more compounds.

In other exemplary embodiments, a precision rod may comprise any of the aforementioned amounts (i.e., at least 0.10 mg through at least 200 mg) of nicotine, anatabine or anabasine not extracted from a *Nicotiana* plant; that is synthesized nicotine, anatabine or anabasine, and they may comprise any of the aforementioned amounts (i.e., at least 0.10 mg through at least 200 mg) of one or more of the following cannabinoid acids: THCA, CBDA, CBCA, CBGA, CBGVA, THCVA, CBDVA and CBCVA that are synthesized, that is, produced outside a *Cannabis* plant. For example, a precision rod may contain 30 mg of THCA and not any other component listed above or may contain 10 mg nicotine, 10 mg THCA and 10 mg CBCA. A precision rod may also contain more than one alkaloid, flavor or other additive.

Precision rods may be any shape or length and depend in part on the amount of flavor, alkaloid, cannabinoid and/or other additive desired to be transferred to the mainstream smoke. Elongated shapes with a pointed end are generally preferred for easier insertion into smoking products such as cigars. Precision rods may be fabricated including, for example, CBDA crystalline (e.g., 20 mg), which is 'pure' CBD and resembles sugar. The crystalline CBDA or any other crystalline cannabinoid may be provided by any method known in the art such as supercritical CO2 extraction processes followed by various pass throughs of purification by ethanolic precipitation, for example, in order to remove remaining impurities until the CBDA is approximately 99 percent pure. The preparation is then ground to a size no smaller than about 100 microns or so and may be blended with other compounds or constituents and it's then incorporated into the precision rod. These precision rods may be utilized by smokers using very low nicotine cigarettes to transition to e-cigarettes or a tobacco heating product, or for quitting tobacco and nicotine products altogether; the methods and products of which are disclosed in U.S. patent application Ser. No. 16/047,948. Precision rods may contain any combination of flavors, alkaloids, cannabinoids and/or other additives, or constituents. For example, and for recreational purposes, a precision rod may contain 10 mg nicotine, 10 mg of CBDA crystalline, 20 mg of THCA crystalline, and 10 mg of menthol crystals.

Any onsert, insert, or precision rod disclosed herein may be applied to any type of cigarette, including make-your-own (MYO) cigarettes in which the adjunct nicotine source may be positioned on the inside of the empty cigarette tube before filling the tube with tobacco, and roll-your-own (RYO) cigarettes in which the adjunct nicotine source may be positioned on the inside of a flat rolling paper before the tobacco is rolled. Otherwise, the onsert, insert, or precision rod may be used with MYO and RYO cigarettes (that are already filled with tobacco) similarly to how they are used with factory-made cigarettes. Any onsert, insert, or precision rod disclosed herein may be applied to any other type of smoking product such as cigars or marijuana smoking products (e.g., joints), whether these smoking products are factory made or hand made by consumers. For example, after removing some tobacco from the tobacco end of a factory-made cigarette, an onsert or precision rod may be placed within that tobacco end, and a portion of the removed tobacco may be put back into the cigarette before lighting the cigarette.

Example 3

Precision Pods for Vaporizers and Smoking Products

Tobacco and cannabis users lack the capability, including product devices and formulations, to conveniently vape or smoke a precisely quantified amount of solid or semi solid form of nicotine and cannabinoids such as one or more crystalline cannabinoid acids in conjunction with one or more crystalline alkaloids (with or without terpenes, flavors and other additives, or plant constituents). Ready-to-vape or ready-to-smoke precision pods are configured for use with vaporizers, pipes, bongs, bowls and the like for the purpose of conveniently vaping or smoking an exact pre-measured and blended amount of one or more compounds, which the precision pods comprise, such as cannabinoids and alkaloids with both the cannabinoid and alkaloid in a solid or semi-solid form. In some exemplary embodiments, precise formulations of blended crystalline cannabinoid acid(s) and crystalline salt(s) of nicotine are provided in precision pods. Precision pods are advantageous on many fronts, especially for those who simultaneously smoke or vape tobacco and cannabis or for those who may not necessarily smoke or vape tobacco and cannabis simultaneously, but are dual users of tobacco and cannabis.

From a harm reduction standpoint, vaping crystalline cannabinoid acid(s) and a crystalline salt of nicotine in ready-to-vape precision pods is less harmful than vaping marijuana buds and tobacco together or vaping an e-cigarette and marijuana buds separately. In the exemplary precision pod embodiments for a vaporizer, less vapor is required to inhale for a given dose of nicotine or a cannabinoid in a solid or semi solid format, as compared to vaping tobacco and cannabis together or separately since the active ingredients are much more concentrated in solid or semi-solid formats (e.g., crystalline compounds) included in precision pods. For example, e-liquids of e-cigarettes contain less than 6 percent nicotine (more than about 95 percent non-active ingredients), and e-liquids of medical vape pens typically contain concentrates of less than 50% cannabinoids which are not crystalline. In contrast, precision pods either do not include any carriers such as propylene glycol or glycerin, or they contain just enough to mimic the moisture levels found in tobacco products or cannabis buds (about 10 to about 17 percent). The result is that ready-to-vape crystalline blends of compounds in precision pods are less harmful to the lungs since the active ingredients are much more concentrated resulting in less vapor required to be inhaled for a given dose of nicotine or a given dose of a cannabinoid.

Propylene glycol and vegetable glycerin are designated, Generally Recognized As Safe (GRAS) by the FDA for ingestion as food additives, but not for inhalation; however, even though using e-cigarettes is widely believed to be less harmful than smoking cigarettes (since smoke is not produced and inhaled), there is insufficient long-term data for inhaling large amounts of propylene glycol or vegetable glycerin from e-cigarettes. Vaping a highly pure crystalline nicotine salt with blends of crystalline cannabinoid acid formulations, for example, without any propylene glycol or glycerin or with low amounts of these carriers (e.g., 5-15 percent by weight of the total blend in the precision pod), results in less mainstream vapor which is less harmful to the lungs, as compared to vaping e-liquids containing a very large proportion of propylene glycol and/or glycerin (e.g., 90%) or vaping whole cannabis flowers or vaping less concentrated forms of cannabinoids.

Likewise, and for those who prefer to smoke and not vape, ready-to-smoke precision pods allow smokers to inhale smoke from highly pure forms of cannabinoids and nicotine. Ready-to-smoke precision pods comprising blends of solid or semi solid crystalline cannabinoid acids (e.g., CBDA and/or THCA) and a salt of nicotine (with or without terpenes, flavors, and/or other additives) contained in the compartment of a precision pod and smoked in a pipe or bowl result in a significant reduction of smoke generated and inhaled for a given level of a cannabinoid and for a given level of nicotine, as compared to smoking blunts, spliffs, or factory-made cigarettes comprising cannabinoids. Since tobacco-related diseases are dose dependent on the cumulative level of tobacco smoke, reducing smoke intake reduces harm. Indeed, the more non-tobacco material (e.g., cannabinoids) in the filler of a conventional, factory-made cigarette, the more likely smokers are to compensate for the reduced levels of nicotine including taking larger puffs, more puffs per cigarette, or more cigarettes per day. A conventional cigarette comprised of any significant portion of cannabinoids in the filler may in fact increase harm to the smoker since a portion of the tobacco, and therefore nicotine, is being reduced. It would be impossible to reduce nicotine levels of a conventional cigarette to levels of a very low nicotine cigarette, in which compensation does not occur, by replacing 80 to 90 percent of the tobacco with cannabinoids since at that point, the cigarette would not function.

Ready-to-smoke precision pods allow the smoker to achieve the same nicotine satisfaction with significantly less smoke, and importantly, there are no carcinogenic tobacco-specific nitrosamines (TSNAs) and other tobacco-related compounds that result from smoking blunts, spliffs, or factory-made cigarettes comprising cannabinoids. If a form of synthetic nicotine is utilized, the precision pod is 100 percent tobacco free. In addition to being less harmful by reducing smoke exposure, as compared to smoking blunts, spliffs or other smoking products such as factory-made cigarettes comprising cannabinoids, ready-to-smoke precision pods comprised of crystalline THCA/THC eliminate the guesswork as to the type and magnitude of intoxicating effects for a given level and ratio of blended compounds since the formulations are consistent due to their purity levels. Flavors, terpenes and other additives, or constituents such as plant constituents (e.g., minimal amounts of very low THC cannabis) may also be incorporated into precision pod formulations at minimal levels.

Figure 3A:
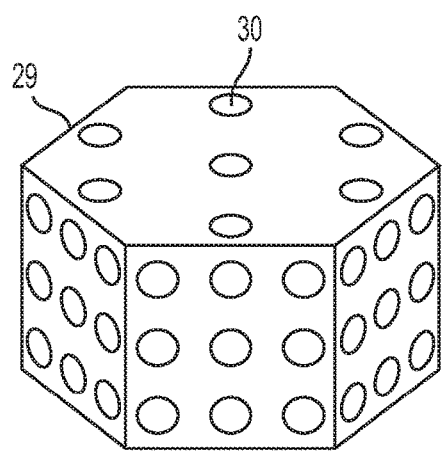
FIG. 3A is a perspective view of an exemplary embodiment of a ready-to-smoke precision pod for a bowl or pipe.

As shown in the exemplary embodiment of FIG. 3A, a precision pod 29 in the shape of a hexagonal prism comprises a blend of a nicotine salt (which may comprise any single or combination of the foregoing listed nicotine salts), crystalline THCA, crystalline CBDA and menthol crystals within the compartment of the precision pod 29. Appropriate levels of ameliorators are added to the blend to smooth out the smoke and remove harshness, and propylene glycol and/or glycerin may also be included so that the blend has the appropriate moisture level. Between about 12 and about 14 percent is the ideal moisture level for tobacco filler and cannabis flowers. The moisture level of formulations of ready-to-smoke precision pods depends on many factors including the boiling point temperature and amount of each compound (and any plant constituents) in the formulation, and the boiling point and total amount of the blend. Different formulations may have different moisture levels. These compounds have been blended together and are in a solid or semi-solid form. Precision pods may comprise two or more vents. The precision pod 29 in FIG. 3A comprises many vents (only one is labeled). A precision pod's vents are for ventilation of inbound air into the compartment and outbound smoke or vapor out of the compartment for inhalation.

Each ready-to-vape or ready-to-smoke precision pod may comprise two or more compounds selected from the group consisting of nicotine, anatabine, anabasine, flavor, Δ9-tetrahydrocannabinolic acid (THCA), cannabidiolic acid (CBDA), cannabichromenenic acid (CBCA), cannabigerolic acid (CBGA), cannabigerovarinic acid (CBGVA), tetrahydrocanabivarinic acid (THCVA), cannabidivarinic acid (CBDVA), cannabichromevarinic acid (CBCVA), myrcene, caryophyllene, pinene, limonene and/or humulene. Each ready-to-vape or ready-to-smoke precision pod may comprise at least the following amounts of each of the aforementioned compounds: 0.10 mg, 0.20 mg, 0.30 mg, 0.40 mg, 0.50 mg, 0.60 mg, 0.70 mg, 0.80 mg, 0.90 mg, 1.0 mg, 1.1 mg 1.2 mg, 1.3 mg, 1.4 mg, 1.5 mg, 1.6 mg, 1.7 mg, 1.8 mg, 1.9 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 46 mg, 47 mg, 48 mg, 49 mg, 50 mg, 51 mg, 52 mg, 53 mg, 54 mg, 55 mg, 56 mg, 57 mg, 58 mg, 59 mg, 60 mg, 61 mg, 62 mg, 63 mg, 64 mg, 65 mg 66 mg, 67 mg, 68 mg, 69 mg, 70 mg, 71 mg, 72 mg, 73 mg, 74 mg, 75 mg 76 mg, 77 mg, 78 mg, 79 mg, 80 mg, 81 mg, 82 mg, 83 mg, 84 mg, 85 mg, 86 mg, 87 mg, 88 mg, 89 mg, 90 mg, 91 mg, 92 mg, 93 mg, 94 mg, 95 mg, 96 mg, 97 mg, 98 mg, 99 mg, 100 mg, 110 mg, 120 mg, 130 mg, 140 mg, 150 mg, 160 mg, 170 mg, 180 mg 190 mg, 200 mg, 250 mg, 300 mg, et cetera. For example, a precision pod may comprise at least 10 mg CBDA, at least 5 mg nicotine and at least 5 mg menthol. As a smoking cessation treatment or to assist transitioning smokers to a tobacco heating product or e-cigarettes, as disclosed in U.S. patent application Ser. No. 16/047,948, any of the aforementioned amounts (i.e., at least 0.10 mg to at least 300 mg) of low nicotine tobacco and/or very low THC cannabis may be included in precision pods along with at least one of the aforementioned compounds for ready-to-vape or ready-to-smoke precision pods.

In some exemplary embodiments, a precision pod may comprise any of the aforementioned amounts (i.e., at least 0.10 mg through at least 300 mg) of nicotine, anatabine or anabasine not extracted from a *Nicotiana* plant; that is synthesized nicotine, anatabine or anabasine, and a precision pod may comprise any of the aforementioned amounts (i.e., at least 0.10 mg through at least 300 mg) of two or more of the following cannabinoid acids: THCA, CBDA, CBCA, CBGA, THCVA, CBDVA, CBCVA and CBGVA that are synthesized, that is, produced outside a *Cannabis* plant. In other exemplary embodiments, any of the aforementioned amounts (i.e., at least 0.10 mg through at least 300 mg) of conventional tobacco, low nicotine tobacco, conventional cannabis (i.e., marijuana) and/or very low THC cannabis may be included in ready-to-vape or ready-to-smoke precision pods along with at least one of the following compounds: nicotine, anatabine, anabasine, flavor, THCA, CBDA, CBCA, CBGA, THCVA, CBDVA, CBCVA and CBGVA, myrcene, caryophyllene, pinene, limonene and/or humulene.

In some exemplary embodiments, ready-to-vape or ready-to-smoke precision pods each comprises at least 5 mg of tobacco (conventional or very low nicotine) and/or at least 5 mg of cannabis (marijuana or very low THC cannabis) and at least 2 mg of one or more of the aforementioned compounds such as THCVA (Tetrahydrocanabivarinic acid). For ready-to-vape or ready-to-smoke precision pods (and onserts or precision rods) herein, low nicotine tobacco means tobacco with a nicotine content equal to or less than 3 mg/g, and very low THC cannabis means cannabis with a collective THCA/THC content equal to or less than 3 mg/g.

Precision pods may be any size or shape including those designed for a specific model of vaporizer, pipe, bowl or bong. The precision pod is configured for the oven chamber of a vaporizer or the tobacco or cannabis chamber of a pipe, bowl or bong. Examples of suitable materials of rigid precision pods include but are not limited to fused quartz or silica, ceramics including non-toxic ultra-high-temperature ceramics, and any metal and preferably a non-toxic metal or metal alloy such as titanium and food-grade stainless steel; however, any material may be utilized for precision pods whether configured for a vaporizer or a pipe, bowl or bong. The material utilized for a vaporizer may depend on the capabilities or temperature ranges of a vaporizer since different materials including metals heat up at different rates. In some exemplary embodiments, a precision pod is configured for a specific model of vaporizer already on the market or a precision pod and a vaporizer are configured for one another during the product development phase of a newly designed vaporizer. In other exemplary embodiments, generic precision pods are configured for multiple types of smoking products or multiple types of vaporizers.

For precision pods configured for smoking products, materials that do not result in combustion or partial combustion are preferred; however, those materials that do result in combustion may also be utilized and comprised of paper-like materials like reconstituted tobacco or other cellulosic materials like those produced from hemp. These types of less rigid precision pods are useful for low doses of compounds. Likewise, for precision pods configured for vaporizers, it is preferred that only the contents in the compartment of the precision pod should be transferred to the mainstream vapor, not compounds or constituents of the precision pod itself. One of the main advantages of disposable ready-to-smoke or ready-to-vape precision pods, whether rigid or not rigid, is the convenience of the precise blends of desired compounds in exact ratios; however in other exemplary embodiments, precision pods may be reusable in which case there may be an access panel that opens and closes with a fastener to provide access for removing spent material and adding fresh compounds. There may be legs at the bottom of a precision pod so the air vents at the bottom of the oven chamber of a vaporizer or the draught hole in the chamber in bowl, pipe or bong is not blocked by the floor of the precision pod. In some exemplary embodiments of ready-to-vape precision pods, the vents at the bottom of the precision pod are configured so that they exactly line up with the vents at the bottom of the oven chamber in a vaporizer. In other exemplary embodiments of ready-to-smoke precision pods, the vent(s) at the bottom of the precision pod are configured so that they exactly line up with the draught hole of the chamber in a bowl, pipe or bong. There may be one or more shelves within the compartment of a precision pod so that the compounds and any constituents are not resting on the floor of the compartment. This depends on the type of compounds in a precision pod and their boiling points, the amount of total compounds in the precision pod, whether there is any plant material in the precision pod and whether a precision pod is specifically made for a specific model of vaporizer or smoking product.

Figure 3B:
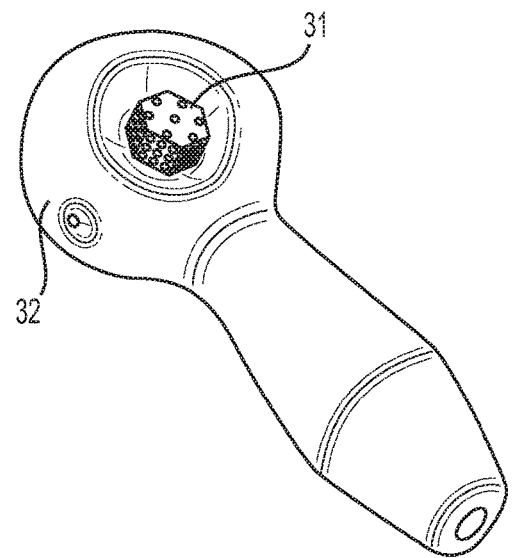
FIG. 3B is a is a perspective view of the ready-to-smoke precision pod of FIG. 3A that has been placed in a smoking product, namely a bowl.

As shown in FIG. 3B, a ready-to-smoke precision pod 31 has been placed within a bowl 32 and may be used with other smoking products such as a pipe or bong. The precision pod comprises the exact blend of compounds and constituents desired and allows the blend in the compartment of the precision pod to heat, melt and burn evenly. An exact blend of crystalline nicotine, crystalline cannabinoid acids (e.g., THCA and CBDA), menthol and ameliorators, for example, dramatically reduces the amount of smoke inhaled for a given dose of nicotine or a given dose of a cannabinoid, as compared to smoking spliffs, bluffs or factory-made cigarettes that include cannabinoids. This is due to the higher concentration of nicotine in this formulation which causes smokers to compensate (i.e., titrate down). Since some embodiments of ready-to-smoke precision pods do not include cannabis plant material (other than crystalline cannabinoids) or tobacco plant material (other than a crystalline nicotine salt), less smoke and 'tar' are produced and inhaled resulting in a less harmful product. In other exemplary embodiments, precision pods do not comprise of any compounds or constituents extracted or derived from tobacco; however, they include synthetic nicotine which results in tobacco-free and nicotine-free precision pod blends.

Figure 3C:
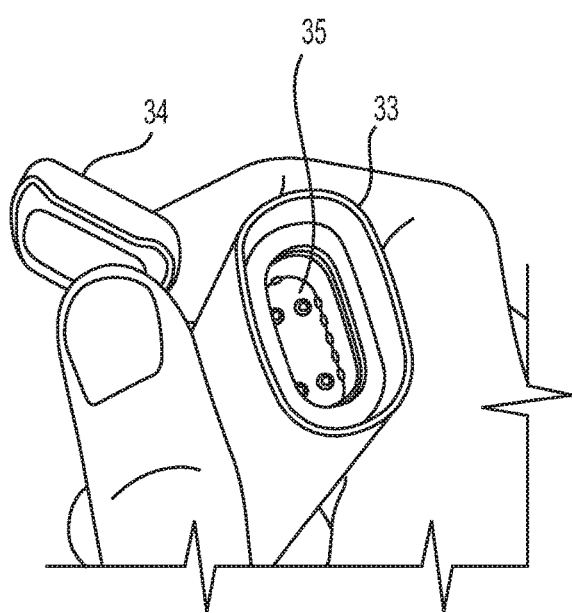
FIG. 3C is a perspective view of a prior art vaporizer being held in which the oven cover has been removed exposing the oven chamber.
Figure 3D:
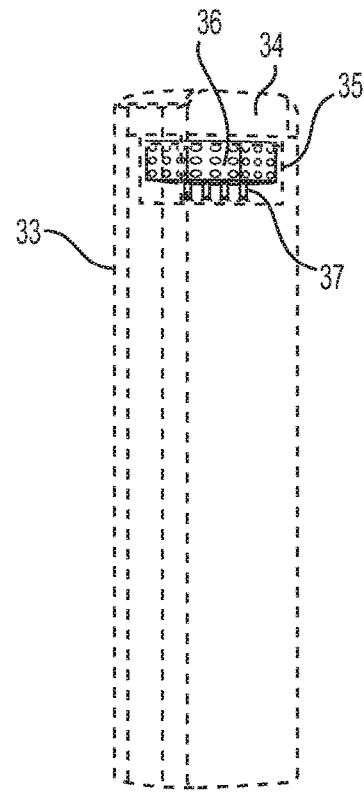
FIG. 3D is a perspective view of an exemplary embodiment of a ready-to-vape precision pod placed within the oven chamber of the prior art vaporizer of FIG. 3C.

As shown in FIG. 3C, a vaporizer 33 is being held and the oven cover 34 has been removed from the top of the vaporizer 33. The oven chamber 35 is exposed which is where a ready-to-vape precision pod may be placed so that a precise amount of two or more compounds or one or more compounds plus plant material(s) such as cannabis may be vaped. As shown in FIG. 3D, the vaporizer 33 now includes an exemplary embodiment of a ready-to-vape-precision pod 36 which has been placed in the vaporizer's oven chamber 35 where it is resting. The ready-to-vape precision pod 36 includes an exact formulation of compounds within its compartment and the precision pod is ready to be used right out of the packaging. Four legs 37 are included on the precision pod to increase air and vapor flow at the bottom of the precision pod. Upon the vaporizer's power being turned on, the oven chamber 35 heats up and the contents of the precision pod, which include at least 5 mg of a crystalline salt of nicotine, at least 5 mg of a crystalline cannabidiolic acid (CBDA) and ameliorators (such as one or more food grade acids like citric acid to smooth out the vapor and remove harshness). This solid or semi solid formulation does not contain, or transfer to the mainstream vapor, carcinogenic tobacco compounds such as TSNAs. The ready-to-vape precision pod 36 of FIG. 3D reduces mainstream vapor exposure, as compared to vaping nicotine containing e-cigarettes, since there is a much greater concentration of nicotine in the mainstream vapor from the precision pod than from e-liquids so the person vaping the precision pod compensates accordingly by inhaling less vapor. Likewise, as compared to a tobacco heating product, there is also a greater concentration of nicotine in the mainstream vapor from the precision pod so less mainstream vapor needs to be inhaled per 1 mg of nicotine desired, which is in addition to the advantage that the mainstream vapor of the precision pod does not contain tobacco carcinogens since the precision pod does not contain tobacco.

Of course, each of the three products: ready-to-vape precision pods, e-cigarettes, and tobacco heating products, results in reduced harm, as compared to combustible cigarettes (with or without added cannabinoids), since nothing is being burned in these three products, there is no tobacco smoke produced which contains thousands of compounds including dozens of carcinogens. Another incidental advantage of ready-to-vape-precision pods is that they keep vaporizers cleaner, as compared to using vaporizers without precision pods, since much of the remaining spent material is kept in the precision pod and does seep into the vents at the bottom of the vaporizer's oven chamber, which results in the vaporizer having to be cleaned less frequently.

In some exemplary embodiments, precision pods include at least 5 mg of low nicotine tobacco and/or at least 5 mg of very low THC cannabis to assist smokers to quit tobacco and nicotine products altogether or to switch to a less harmful product such as e-cigarettes, tobacco heating products or precision pods. See U.S. patent application Ser. No. 16/047,948 for methods and various types of products to transition conventional cigarette smokers to less harmful products. Precision pods that comprise low nicotine tobacco and/or very low THC cannabis may further comprise at least 2 mg of one or more compounds selected from the group consisting of THCA, CBDA, CBCA, CBGA, THCVA, CBDVA, CBCVA, CBGVA, nicotine, anatabine, anabasine, myrcene, caryophyllene, pinene, limonene and humulene. For example, a precision pod comprising at least 50 mg of low nicotine tobacco, at least 50 mg of very low THC cannabis, and at least 5 mg of CBDA, results in much less smoke exposure than a very low nicotine cigarette comprising about 600 mg of low nicotine tobacco.

For formulations of precision pods comprising intoxicating compounds such as THCA/THC, the type and magnitude of intoxicating effects are predictable from using precision pods with precisely quantified ready-to-vape or ready-to-smoke blends. For example, blends of crystalline or near crystalline cannabinoid acids, including Δ9-tetrahydrocannabinolic acid (THCA), and a crystalline or near crystalline salt(s) of nicotine (with or without terpenes, flavors, and/or other additives, or constituents such as plant constituents), are advantageous for dual users of tobacco and recreational marijuana in terms of exposure to tobacco toxins and convenience. Ready-to-vape precision pods comprising blends of crystalline or near crystalline cannabinoid acids, including cannabidiolic acid (CBDA), are advantageous for those who seek relief from pain and do not desire to inhale the voluminous vapor from vape pens.

As potency of cannabis concentrates increases, accurate dosing gets more difficult, and THC effects can be quite variable. Consuming cannabis concentrates such as crystalline cannabinoids, wax, budder, oil, shatter or sap, is typically accomplished by 'dabbing,' which is positioning the concentrate on an extremely hot metal object such as a nail that is heated by a blowtorch or the like, and then the vapor is inhaled. Besides being a dangerous and cumbersome procedure, it is extremely difficult to obtain the correct amount of concentrate which often leads to over-consumption and unpleasant effects. The potential safety issues and potential intoxicating effects of the THC concoction are often unknown, and the actual intoxicating effects may vary widely including from one cannabis-concentrate production batch to another. The THC percentage may not be known or accurate and the 'entourage effect' from the interactions of the various cannabinoids and impurities is difficult to predict. These downsides also occur with concentrates used in vaporizers.

Benefits of ready-to-smoke and ready-to-vape precision pods comprising one or more crystalline cannabinoid acids, as compared to dabbing, is that each of the one or more crystalline cannabinoid acids comprise an exact measured dose of the cannabinoid acid (up to about to 99% pure) that is ready to smoke or vape without preparation and the precision pod results in virtually consistent effects for the same person. In some exemplary embodiments of precision pods, the aforementioned amounts of THCA in milligrams, along with the purity level of THCA (THCA weight divided by total weight of the compounds and any additives or constituents in the precision pod), is clearly conveyed on the packaging such as at least about 80%, at least about 85%, at least about 90%, at least about 93%, at least about 95%, at least about 97%, at least about 98%, or at least about 99%, so that end users know what effects to expect for a given THCA content and THCA ratio of the blend. For example, the predictability and consistency of the effects of a precision pod which includes 5 mg of a salt of nicotine, 50 mg of crystalline THCA and 20 mg of crystalline CBDA, 17.5 mg of very low THC cannabis (>0.30% THCA) and 7.5 mg of a carrier and/or ameliorator is quite beneficial for cannabis users who desire exact, potent and consistent effects along with concurrent THC/nicotine effects. The THC purity level of this 100 mg precision pod blend is 50% (50 mg/100 mg). The nicotine/THC ratio is 10%, and the CBD/THC ratio is 40%. As compared to dabbing or vaping other concentrates in which the cannabinoid ratios and THC levels are either not known or not consistent in every production batch, ready-to-vape and ready-to-smoke precision pods comprising crystalline cannabinoids are beneficial for cannabis users who desire consistency with concentrates and do not want to consume too much THC at once. The purity of exactly measured quantities of and ratios of crystalline cannabinoids and forms of crystalline nicotine in combination with precision pods not only results in consistency and reduced harm, the convenience of ready-to-smoke and ready-to-vape precision pods is also advantageous over dabbing or using multiple vaping devices.

The advantages of precision pods readily become apparent for overcoming the biological constraints on the cannabis plant of intrinsically producing certain minor cannabinoids and certain ratios of cannabinoids. For example, Tetrahydrocanabivarinic acid (THCVA) which decarboxylates to Tetrahydrocannabivarin (THCV), is a minor cannabinoid found at trace levels in most cannabis strains. Sativa strains tend to have higher THCVA content. THCV may be an important appetite suppressant, therapeutic to reduce panic attacks, and therapeutic for the treatment of nicotine dependence and possibly other types of dependence. Due to THCV being a minor cannabinoid, it would be extremely difficult if not impossible to vape or smoke flowers from a cannabis strain which comprises a THCVA to THCA ratio of at least 3/2 or a THCVA to CBDA ratio of at least 3/2. In some exemplary embodiments, THCVA is extracted and isolated for use in precision pods (or onserts or precision rods) comprising a THCVA to THCA ratio of at least 3/2. In other exemplary embodiments, THCVA is extracted and isolated for use in precision pods (or onserts or precision rods) comprising a THCVA to CBDA ratio of at least 3/2. Tetrahydrocanabivarinic acid (THCVA) may be synthesized and utilized in precision pods, precision rods and onserts.

It will be appreciated that any exemplary embodiment herein may be automated with a machine whether it is a purely mechanical machine, table-top machine, or more substantial electrical type of machine. For example, in some exemplary embodiments, machines may provide adjunct nicotine sources (e.g., precision rods) to multiple cigarettes at once such as an entire pack of twenty cigarettes.

Certain precision rods, onserts, ready-to-vape precision pods and ready-to-smoke precision pods that comprise crystalline alkaloids may not be considered tobacco products in some jurisdictions since, among other reasons, they do not contain tobacco other than alkaloids, which may or may not be derived from tobacco plants. The alkaloids of these articles may be synthesized so that no ingredients whatsoever are from tobacco plants. Likewise, in some exemplary embodiments, the cannabinoids used in onserts, precision rods or precision pods may be synthesized and produced outside of a cannabis plant. In other exemplary embodiments, synthetic alkaloids and synthetic cannabinoids are blended resulting in formulations used in onserts, precision rods or precision pods which do not contain any *Nicotiana* or *Cannabis* plant material.

What is claimed is:

1. A nicotine-enhanced cigarette comprising:
a cigarette comprising a roll of tobacco wrapped in paper; and
an onsert adhered to the paper of the cigarette, the onsert comprising an adjunct source of nicotine in a solid or semi solid form, a cellulosic wrapper, and an adhesive for adhering the onsert onto or around the paper of the cigarette,
wherein the onsert applied onto or around the cigarette increases nicotine in mainstream smoke of the cigarette, and
wherein the onsert applied onto or around the cigarette increases nicotine yield of the cigarette by at least 10 percent, as compared to the cigarette without the onsert, and measured by an International Standards Organization (ISO) smoking-machine test method.

2. The nicotine-enhanced cigarette of claim 1, wherein the adhesive is a self-stick adhesive.

3. The nicotine-enhanced cigarette of claim 1, wherein the cellulosic wrapper comprises cannabis.

4. A method of increasing the nicotine smoke yield of a cigarette, the method comprising:
providing an onsert comprising nicotine in a solid or semi solid form, a cellulosic wrapper, and an adhesive for adhering the onsert onto or around paper of the cigarette; and
applying the onsert onto or around the cigarette via the adhesive, wherein the onsert applied onto or around the cigarette increases nicotine in mainstream smoke of the cigarette, and
wherein the onsert applied onto or around the cigarette increases nicotine yield of the cigarette by at least 10 percent, as compared to the cigarette without the onsert, and measured by an International Standards Organization (ISO) smoking-machine test method.

5. The method of claim 4, wherein the adhesive is a self-stick adhesive.

6. The method of claim 4, wherein the cellulosic wrapper comprises cannabis.

7. An anatabine-enhanced cigarette comprising:
a cigarette comprising a roll of tobacco wrapped in paper; and
an onsert adhered to the paper of the cigarette, the onsert comprising an adjunct source of anatabine in a solid or semi solid form, a cellulosic wrapper, and an adhesive for adhering the onsert onto or around the paper of the cigarette,
wherein the onsert applied onto or around the cigarette increases anatabine in the mainstream smoke of the cigarette; and
wherein the onsert applied onto or around the cigarette increases anatabine yield of the cigarette by at least 10 percent, as compared to the cigarette without the onsert, and measured by an International Standards Organization (ISO) smoking-machine test method.

8. The anatabine-enhanced cigarette of claim 7, wherein the adhesive is a self-stick adhesive.

9. The anatabine-enhanced cigarette of claim 7, wherein the cellulosic wrapper comprises cannabis.

10. An anabasine-enhanced cigarette comprising:
a cigarette comprising a roll of tobacco wrapped in paper; and
an onsert adhered to the paper of the cigarette, the onsert comprising an adjunct source of anabsine in a solid or semi solid form, a cellulosic wrapper, and an adhesive for adhering the onsert onto or around the paper of the cigarette,
wherein the onsert applied onto or around the cigarette increases anabasine in the mainstream smoke of the cigarette; and
wherein the onsert applied onto or around the cigarette increases anabasine yield of the cigarette by at least 10 percent, as compared to the cigarette without the onsert, and measured by an International Standards Organization (ISO) smoking-machine test method.

11. The anabasine-enhanced cigarette of claim 10, wherein the adhesive is a self-stick adhesive.

12. The anabasine-enhanced cigarette of claim 10, wherein the cellulosic wrapper comprises cannabis.

* * * * *